US011812250B2

(12) United States Patent
Griffiths et al.

(10) Patent No.: US 11,812,250 B2
(45) Date of Patent: Nov. 7, 2023

(54) PLAYBACK DEVICE CALIBRATION

(71) Applicant: Sonos, Inc., Santa Barbara, CA (US)

(72) Inventors: Neil Griffiths, Lexington, MA (US); Mike Chamness, Gloucester, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/952,714

(22) Filed: Sep. 26, 2022

(65) Prior Publication Data

US 2023/0093725 A1    Mar. 23, 2023

Related U.S. Application Data

(63) Continuation of application No. 17/005,026, filed on Aug. 27, 2020, now Pat. No. 11,457,327, which is a
(Continued)

(51) Int. Cl.
*H04S 7/00* (2006.01)
*H04R 3/14* (2006.01)
(Continued)

(52) U.S. Cl.
CPC .......... *H04S 7/301* (2013.01); *G06F 3/04847* (2013.01); *G06F 3/04883* (2013.01);
(Continued)

(58) Field of Classification Search
CPC .............................................. H04R 2227/005
See application file for complete search history.

(56) References Cited

U.S. PATENT DOCUMENTS 4,696,037 A    9/1987 Fierens
4,908,868 A    3/1990 McTaggart
(Continued)

FOREIGN PATENT DOCUMENTS

EP    1124175 A2    8/2001
EP    1133896 B1    8/2002
(Continued)

OTHER PUBLICATIONS

Advisory Action dated Aug. 1, 2014, issued in connection with U.S. Appl. No. 13/186,249, filed Jul. 19, 2011, 2 pages.
(Continued)

*Primary Examiner* — James K Mooney

(57) ABSTRACT

A first subwoofer may be configured to output multimedia content in synchrony with at least one other playback device and a second subwoofer. The first subwoofer may, based on a received indication of an acoustic characteristic of the at least one other playback device, determine a crossover frequency of (i) the first subwoofer and the second subwoofer and (ii) the at least one other playback device. After determining the crossover frequency, the first subwoofer may output a first tone set and a second tone set in synchrony with the second subwoofer and the at least one other playback device, and after outputting the first tone set and the second tone set, receive, from a controller device, an indication of a selected one of the first tone set or the second tone set. Based on the selected tone set, the first subwoofer may adjust a phase setting of the first subwoofer.

20 Claims, 14 Drawing Sheets

Related U.S. Application Data continuation of application No. 16/154,357, filed on Oct. 8, 2018, now Pat. No. 10,771,911, which is a continuation of application No. 15/342,893, filed on Nov. 3, 2016, now Pat. No. 10,097,942, which is a continuation of application No. 13/466,877, filed on May 8, 2012, now Pat. No. 9,524,098.

(51) Int. Cl.
| | | |
|---|---|---|
| *H04R 29/00* | (2006.01) | |
| *G06F 3/04847* | (2022.01) | |
| *G06F 3/04883* | (2022.01) | |
| *G06F 3/16* | (2006.01) | |
| *H04R 3/04* | (2006.01) | |
| *H04R 27/00* | (2006.01) | |

(52) U.S. Cl.
CPC ............... *G06F 3/165* (2013.01); *H04R 3/14* (2013.01); *H04R 29/001* (2013.01); *H04S 7/307* (2013.01); *H04R 3/04* (2013.01); *H04R 27/00* (2013.01); *H04R 2227/005* (2013.01)

(56) References Cited

U.S. PATENT DOCUMENTS

| | | |
|---|---|---|
| 4,995,778 A | 2/1991 | Bruessel |
| 5,440,644 A | 8/1995 | Farinelli et al. |
| 5,553,147 A | 9/1996 | Pineau |
| 5,761,320 A | 6/1998 | Farinelli et al. |
| 5,910,991 A | 6/1999 | Farrar |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,674,864 B1 | 1/2004 | Kitamura |
| 6,681,019 B1 | 1/2004 | Kitano et al. |
| 6,757,517 B2 | 6/2004 | Chang |
| 6,771,784 B2 | 8/2004 | Murata |
| 6,778,869 B2 | 8/2004 | Champion |
| 6,809,635 B1 | 10/2004 | Kaaresoja |
| 6,882,335 B2 | 4/2005 | Saarinen |
| 7,072,477 B1 | 7/2006 | Kincaid |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,490,044 B2 | 2/2009 | Kulkarni |
| 7,519,188 B2 | 4/2009 | Berardi et al. |
| 7,571,014 B1 | 8/2009 | Ambourne et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,063,698 B2 | 11/2011 | Howard |
| 8,103,009 B2 | 1/2012 | McCarty et al. |
| 8,139,774 B2 | 3/2012 | Berardi et al. |
| 8,160,281 B2 | 4/2012 | Kim et al. |
| 8,175,292 B2 | 5/2012 | Aylward et al. |
| 8,229,125 B2 | 7/2012 | Short |
| 8,233,632 B1 | 7/2012 | MacDonald et al. |
| 8,234,395 B2 | 7/2012 | Millington |
| 8,238,578 B2 | 8/2012 | Aylward |
| 8,243,961 B1 | 8/2012 | Morrill |
| 8,265,310 B2 | 9/2012 | Berardi et al. |
| 8,290,185 B2 | 10/2012 | Kim |
| 8,306,235 B2 | 11/2012 | Mahowald |
| 8,325,935 B2 | 12/2012 | Rutschman |
| 8,331,585 B2 | 12/2012 | Hagen et al. |
| 8,391,501 B2 | 3/2013 | Khawand et al. |
| 8,452,020 B2 | 5/2013 | Gregg et al. |
| 8,483,853 B1 | 7/2013 | Lambourne |
| 8,527,876 B2 | 9/2013 | Wood et al. |
| 8,577,045 B2 | 11/2013 | Gibbs |
| 8,600,075 B2 | 12/2013 | Lim |
| 8,620,006 B2 | 12/2013 | Berardi et al. |
| 8,855,319 B2 | 10/2014 | Liu et al. |
| 8,879,761 B2 | 11/2014 | Johnson et al. |
| 8,914,559 B2 | 12/2014 | Kalayjian et al. |
| 8,934,647 B2 | 1/2015 | Joyce et al. |
| 8,934,655 B2 | 1/2015 | Breen et al. |
| 8,965,546 B2 | 2/2015 | Visser et al. |
| 8,977,974 B2 | 3/2015 | Kraut |
| 8,984,442 B2 | 3/2015 | Pirnack et al. |
| 8,989,406 B2 | 3/2015 | Wong et al. |
| 9,020,153 B2 | 4/2015 | Britt, Jr. |
| 9,042,556 B2 | 5/2015 | Kallai et al. |
| 9,748,646 B2 | 8/2017 | Kallai et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0023697 A1 | 2/2004 | Komura |
| 2004/0024478 A1 | 2/2004 | Hans et al. |
| 2005/0069153 A1 | 3/2005 | Hall et al. |
| 2005/0201549 A1 | 9/2005 | Dedieu et al. |
| 2006/0050896 A1 | 3/2006 | Sung |
| 2007/0003067 A1 | 1/2007 | Gierl et al. |
| 2007/0032895 A1 | 2/2007 | Nackvi et al. |
| 2007/0142944 A1 | 6/2007 | Goldberg et al. |
| 2007/0265031 A1 | 11/2007 | Koizumi et al. |
| 2008/0144864 A1 | 6/2008 | Huon et al. |
| 2008/0146289 A1 | 6/2008 | Korneluk et al. |
| 2009/0011798 A1 | 1/2009 | Yamada |
| 2009/0180632 A1 | 7/2009 | Goldberg et al. |
| 2010/0142735 A1 | 6/2010 | Yoon et al. |
| 2011/0002487 A1 | 1/2011 | Panther et al. |
| 2011/0170710 A1 | 7/2011 | Son |
| 2012/0033818 A1* | 2/2012 | De Poortere .......... H04R 3/007 381/17 |
| 2012/0051558 A1 | 3/2012 | Kim et al. |
| 2012/0051567 A1 | 3/2012 | Castor-Perry |
| 2012/0127831 A1 | 5/2012 | Gicklhorn et al. |
| 2012/0148075 A1 | 6/2012 | Goh et al. |
| 2012/0263325 A1 | 10/2012 | Freeman et al. |
| 2013/0010970 A1 | 1/2013 | Hegarty et al. |
| 2013/0022221 A1 | 1/2013 | Kallai et al. |
| 2013/0028443 A1 | 1/2013 | Pance et al. |
| 2013/0129122 A1 | 5/2013 | Johnson et al. |
| 2013/0202131 A1 | 8/2013 | Kemmochi et al. |
| 2013/0259254 A1 | 10/2013 | Xiang et al. |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0112481 A1 | 4/2014 | Li et al. |
| 2014/0192986 A1 | 7/2014 | Lee et al. |
| 2014/0219456 A1 | 8/2014 | Morrell et al. |
| 2014/0219483 A1 | 8/2014 | Hong |
| 2014/0226823 A1 | 8/2014 | Sen et al. |
| 2014/0294200 A1 | 10/2014 | Baumgarte et al. |
| 2014/0355768 A1 | 12/2014 | Sen et al. |
| 2014/0355794 A1 | 12/2014 | Morrell et al. |
| 2015/0063610 A1 | 3/2015 | Mossner |
| 2015/0146886 A1 | 5/2015 | Baumgarte |
| 2015/0201274 A1 | 7/2015 | Ellner et al. |
| 2015/0281866 A1 | 10/2015 | Williams et al. |

FOREIGN PATENT DOCUMENTS

| | | | |
|---|---|---|---|
| EP | 1389853 | A1 | 2/2004 |
| EP | 1825713 | B1 | 10/2012 |
| EP | 2860992 | A1 | 4/2015 |

(56) References Cited

FOREIGN PATENT DOCUMENTS

| JP | 2002111817 | 4/2002 |
|---|---|---|
| JP | 2005136457 | 5/2005 |
| JP | 2009135750 | 6/2009 |
| JP | 2011055043 A | 3/2011 |
| JP | 2011130496 | 6/2011 |
| WO | 200153994 | 7/2001 |
| WO | 2003093950 A2 | 11/2003 |
| WO | 2015024881 A1 | 2/2015 |

OTHER PUBLICATIONS

Advisory Action dated Nov. 12, 2015, issued in connection with U.S. Appl. No. 13/466,877, filed May 8, 2012, 7 pages.
Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
De Boer, Clint. "Bass Management Basics—Settings Made Simple." Audioholics. N.P., Apr. 28, 2010. Web.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated Dec. 14, 2015, issued in connection with European Application No. 12814263.5, 6 pages.
European Patent Office, European Extended Examination Report dated Jan. 5, 2016, issued in connection with European Application No. 15002531.0, 8 pages.
Final Office Action dated Apr. 10, 2014, issued in connection with U.S. Appl. No. 13/186,249, filed Jul. 19, 2011, 12 pages.
Final Office Action dated Jul. 17, 2015, issued in connection with U.S. Appl. No. 13/466,877, filed May 8, 2012, 11 pages.
Final Office Action dated Sep. 25, 2019, issued in connection with U.S. Appl. No. 16/154,357, filed Oct. 8, 2018, 11 pages.
Horwitz, Jeremy, "Logic3 i-Station25," retrieved from the internet: http://www.ilounge.com/index.php/reviews/entry/logic3-i-station25/, last visited Dec. 17, 2013, 5 pages.
International Bureau, International Preliminary Report on Patentability dated Jan. 30, 2014, issued in connection with International Application No. PCT/US2012/045894, filed on Jul. 9, 2012, 6 pages.
International Searching Authority, International Search Report dated Dec. 26, 2012, issued in connection with International Application No. PCT/US2012/045894, filed on Jul. 9, 2012, 3 pages.
International Searching Authority, Written Opinion dated Dec. 26, 2012, issued in connection with International Application No. PCT/US2012/045894, filed on Jul. 9, 2012, 4 pages.

Japanese Patent Office, Notice of Rejection, dated Feb. 3, 2015, issued in connection with Japanese Patent Application No. 2014-521648, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 10, 2018, issued in connection with U.S. Appl. No. 15/342,893, filed Nov. 3, 2016, 9 pages.
Non-Final Office Action dated Sep. 11, 2014, issued in connection with U.S. Appl. No. 13/186,249, filed Jul. 19, 2011, 11 pages.
Non-Final Office Action dated Jan. 16, 2015, issued in connection with U.S. Appl. No. 13/466,877, filed May 8, 2012, 13 pages.
Non-Final Office Action dated Oct. 18, 2021, issued in connection with U.S. Appl. No. 17/005,026, filed Aug. 27, 2020, 9 pages.
Non-Final Office Action dated Mar. 19, 2019, issued in connection with U.S. Appl. No. 16/154,357, filed on Oct. 8, 2018, 9 pages.
Non-Final Office Action dated Jan. 22, 2016, issued in connection with U.S. Appl. No. 13/466,877, filed May 8, 2012, 14 pages.
Non-Final Office Action dated Sep. 25, 2013, issued in connection with U.S. Appl. No. 13/186,249, filed Jul. 19, 2011, 12 pages.
Notice of Allowance dated Aug. 5, 2016, issued in connection with U.S. Appl. No. 13/466,877, filed May 8, 2012, 8 pages.
Notice of Allowance dated Apr. 10, 2015, issued in connection with U.S. Appl. No. 13/186,249, filed Jul. 19, 2011, 16 pages.
Notice of Allowance dated May 10, 2022, issued in connection with U.S. Appl. No. 17/005,026, filed Aug. 27, 2020, 12 pages.
Notice of Allowance dated Jul. 17, 2018, issued in connection with U.S. Appl. No. 15/342,893, filed Nov. 3, 2016, 7 pages.
Notice of Allowance dated May 6, 2020, issued in connection with U.S. Appl. No. 16/154,357, filed Oct. 8, 2018, 7 pages.
Palm, Inc., "Handbook for the Palm VII Handheld," May 2000, 311 pages.
Presentations at WinHEC 2000, May 2000, 138 pages.
Roland Corporation, "Roland announces BA-55 Portable PA System," press release, Apr. 6, 2011, 2 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Frequency | Amplitude | Piano Note |
|---|---|---|
| 36.708 | 1 | D1 |
| 41.204 | 1 | E1 |
| 46.249 | 1 | F#1 |
| 49.000 | 1 | G1 |
| 55.000 | 1 | A1 |
| 61.736 | 1 | B1 |
| 65.407 | 1 | C1 |
| 73.416 | 1 | D2 |

902 → 55.000

PLAYBACK DEVICE CALIBRATION

CROSS REFERENCE TO RELATED APPLICATIONS

This application claims the benefit of priority as a continuation under 35 U.S.C. § 120 to U.S. application Ser. No. 17/005,026, filed Aug. 27, 2020, and entitled "Playback Device Calibration," which is a continuation of U.S. application Ser. No. 16/154,357, filed Oct. 8, 2018, issued as U.S. Pat. No. 10,771,911, and entitled "Playback Device Calibration," which is a continuation of U.S. application Ser. No. 15/342,893, filed Nov. 3, 2016, issued as U.S. Pat. No. 10,097,942, and entitled "Playback Device Calibration", which is a continuation of U.S. application Ser. No. 13/466,877, filed May 8, 2012, issued as U.S. Pat. No. 9,524,098, and entitled "Methods and Systems for Subwoofer Calibration", the contents of each of which are herein incorporated by reference in their entirety for all purposes.

FIELD OF THE DISCLOSURE

This disclosure relates generally to audio devices and, more particularly, to methods and systems for subwoofer calibration.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Given the high demand for such audio and video content, technology used to access and play such content has likewise improved. Local playback systems can be configured with one or more playback devices to access and play such audio and video content. To deliver the best possible sound, the local playback system allows the listener to adjust various Digital Signal Processing (DSP) settings (e.g., equalization settings) of the playback devices.

Figure 1:
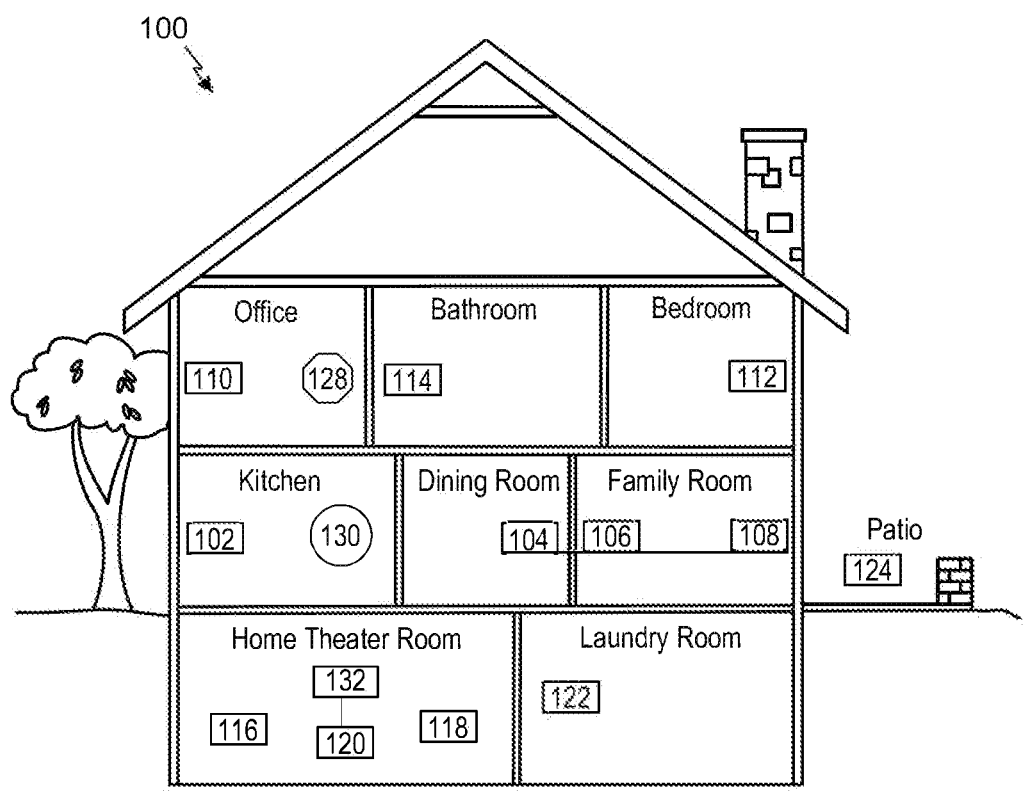
FIG. 1 illustrates an example system in which embodiments of the methods and systems disclosed herein may be implemented.

In addition, the drawings are for the purpose of illustrating example embodiments, but it is understood that the present disclosure is not limited to the arrangements and instrumentality shown in the drawings.

DETAILED DESCRIPTION

I. Overview

Certain embodiments disclosed herein enable configuration of particular equalization settings such as, for example, crossover frequency, phase difference and/or subwoofer level (e.g., gain) settings. Music listeners have a variety of choices when installing or preparing a playback system (e.g., a home music system) in a listening zone (e.g., room, shared acoustic environment, etc.). For example, a music listener can adjust the number of playback devices in the listening zone, the types of playback devices included in the listening zone, the placement of the playback devices within the listening zone and/or the size of the playback devices used in the listening zone. Additionally, each music listener may have personal preferences regarding the level (e.g., volume) of playback devices in the listening zone.

Each decision in preparing the playback system may have a different effect on the overall playback experience by the listener. For example, the number of playback devices used to play the audio enhances the playback characteristics. For instance, two playback devices in a listening zone may be paired to play two separate sounds in left and right channels.

The audio capabilities of playback devices may enhance the audio experience by using different playback devices to play different frequency ranges. A frequency range is a portion (e.g., subset) of the audio (e.g., frequency) spectrum output. The placement of the playback devices within the listening zone may change the way audio is perceived. For example, two playback devices in the same zone may destructively interfere at overlapping frequencies and cause the sound at the overlapping frequencies to cancel out. Also, objects in a listening zone relative to the playback device may affect the audio.

The size of the playback device may impact the quality and/or volume experienced at certain frequencies. For example, playback devices of a particular size may not be able to reproduce low frequency sounds without distorting the sounds.

The examples disclosed herein enable configuration of subwoofers in a playback system. The examples disclosed herein provide a subwoofer with equalization settings that adjust based on user preferences. Certain examples used herein allow a user to identify a preferred tone set (e.g., series of tones) via a graphical user interface. The identified tone set is received by a playback device in a playback system and the subwoofer automatically calibrates equalization parameters based on a user preference of the tone sets. Additional embodiments are described herein.

Although the following discloses example systems, methods, and apparatus including, among other components, firmware and/or software executed on hardware, it should be noted such systems, methods, and/or apparatus are merely illustrative and should not be considered as limiting. For example, it is contemplated any or all of these firmware, hardware, and/or software components could be embodied exclusively in hardware, exclusively in software, exclusively in firmware, or in any combination of hardware, software, and/or firmware. Accordingly, while the following describes example systems, methods, and/or apparatus, the examples provided are not the only way(s) to implement such systems, methods, and/or apparatus.

When any of the appended claims are read to cover a purely software and/or firmware implementation, at least one of the elements in at least one example is hereby expressly defined to include a tangible medium such as a memory, digital versatile disk (DVD), compact disc (CD), Blu-ray, and so on, storing the software and/or firmware.

These embodiments and many additional embodiments are described more below. Further, the detailed description is presented largely in terms of illustrative environments, systems, procedures, steps, logic blocks, processing, and other symbolic representations which directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art certain embodiments of the present disclosure may be practiced without certain, specific details. In other instances, well known methods, procedures, components, and circuitry have not been described in detail to avoid unnecessarily obscuring aspects of the embodiments.

Reference herein to "embodiment" means a particular feature, structure, or characteristic described in connection with the embodiment may be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

The example method includes calibrating equalization settings based on the user selection of a preferred tone set. The example method includes passing information regarding the subwoofer configurations to a playback system including one or more multimedia playback devices in response to a user selection.

Certain embodiments provide a method to calibrate a subwoofer. The example method includes determining a crossover frequency of a playback system, and the playback system includes the subwoofer and at least one other playback device. The example method includes the subwoofer and the at least one other playback device configured to output a multimedia content in synchronization. The example method also includes outputting from the subwoofer and the at least one other playback device a series of tones near the crossover frequency. The example method also includes prompting a user to select a preferred sound from the series of tones based on the level (e.g., gain) of the tone set being played. Also, the example method includes automatically adjusting a phase of the subwoofer in relation to the playback device based on the user selection.

Certain embodiments provide a subwoofer device including a communication interface, a speaker driver and a processor. The example processor is to receive, via the communication interface, a frequency range of a playback device configured to output multimedia content in synchronization with the subwoofer device. The example processor is to determine a crossover frequency based on the frequency range. The example processor is to output, in synchronization with the playback device, a first tone set and a second tone set. In the example, the first tone set and the second tone set are the same tones but the second tone set is to be played by the playback device in a reversed polarity. The example processor is to receive an indication of a selection of the first tone set or the second tone set. The example processor is to calibrate a phase of the subwoofer device based on the received indication.

Certain embodiments provide a computer readable storage medium including instructions for execution by a processor. The instructions, when executed, cause the processor to implement a method to identify a subwoofer and at least one other playback device. The subwoofer is to be configured to output multimedia content in synchronization with the at least one other playback device, and the subwoofer and the at least one other playback device are to be coupled to a playback system. The example method includes determining the crossover frequency of the subwoofer and the at least one other playback device. The example method includes generating a first tone set. The example method includes generating a second tone set based on the first tone set, wherein the playback of the second tone set includes a phase offset from the first tone set of the subwoofer with respect to at least one other playback device. The example method includes receiving input selecting the first tone set or the second tone set. The example method includes adjusting a phase setting of the subwoofer or the at least one other playback device based on the received input.

II. Example Environment

Referring now to the drawings, in which like numerals can refer to like parts throughout the figures, FIG. 1 shows an example system configuration 100 in which one or more of the methods and/or apparatus disclosed herein can be practiced or implemented. By way of illustration, the system configuration 100 represents a home with multiple zones. Each zone (e.g., listening zone), for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, a multimedia unit, speaker, subwoofer, and so on, provides audio, video and/or audiovisual output. A controller 130 (e.g., shown in the kitchen for purposes of illustration) provides control to the system configuration 100. While multiple controllers can be used simultaneously in the system configuration 100 such that when a change is made using one controller, all controllers are updated to have the latest state, only one controller 130 is shown for purposes of illustration. The system configuration 100 illustrates an example whole house audio system, though it is understood that the technology described herein is not limited to its particular place of application or to an expansive system like a whole house audio system 100 of FIG. 1.

Referring to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Audio content can be accessed via cloud-based storage, for example. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 2:
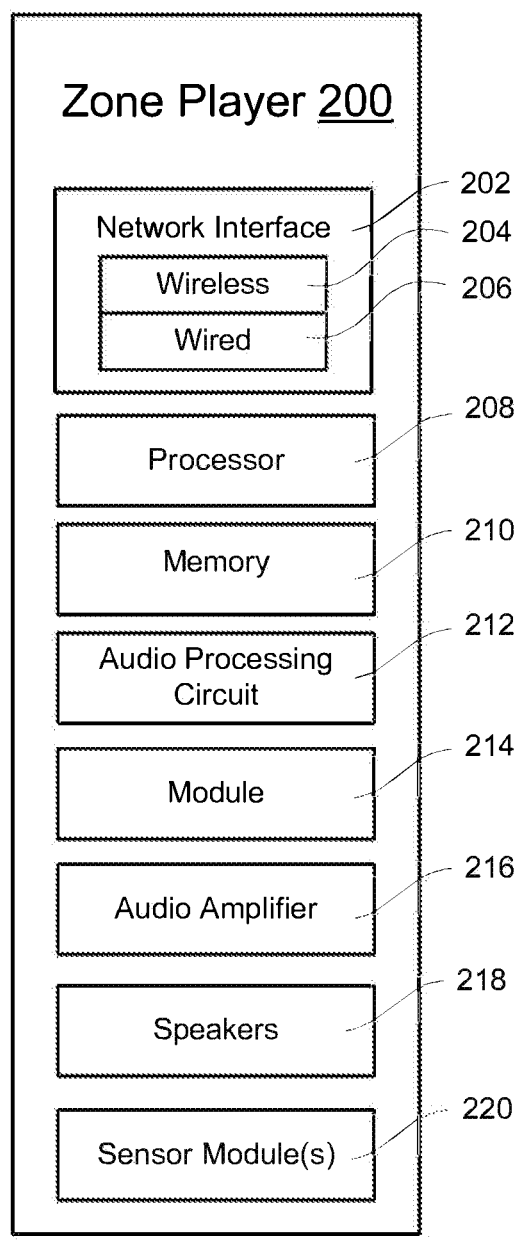
FIG. 2 is an example implementation of the example zone players of FIG. 1.

Referring now to FIG. 2, there is shown an example functional block diagram of a zone player 200 in accordance with an embodiment. The zone player 200 of FIG. 2 includes a network interface 202, a processor 208, a memory 210, an audio processing component 212, a module 214, an audio amplifier 216, and a speaker unit 218 coupled to the audio amplifier 216. Other types of zone players may not include speaker unit 218 or the audio amplifier 216. Other types of zone players may include a sensor module 220 such as, for example, an accelerometer. Further, it is contemplated that the zone player 200 can be integrated into another component. For example, the zone player 200 could be constructed as part of a lamp for indoor or outdoor use. The example zone player 200 could be integrated into a television, for example.

In the illustrated example of FIG. 2, the network interface 202 facilitates a data flow between zone players and other devices on a data network (e.g., the data network 128 of FIG. 1) and the zone player 200. In some embodiments, the network interface 202 can manage the assembling of an audio source or file into smaller packets that are to be transmitted over the data network or reassembles received packets into the original source or file. In some embodiments, the network interface 202 can further handle the address part of each packet so that it gets to the right destination or intercepts packets destined for the zone player 200. Accordingly, in certain embodiments, each of the packets includes an Internet Protocol (IP)-based source address as well as an IP-based destination address.

In some embodiments, the network interface 202 can include one or both of a wireless interface 204 and a wired interface 206. The wireless interface 204, also referred to as an RF interface, provides network interface functions for the zone player 200 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11g, 802.11n, or 802.15). To receive wireless signals and to provide the wires signals to the wireless interface 204 and to transmit wireless signals, the zone player 200 of FIG. 2 includes one or more antennas. The wired interface 206 provides network interface functions for the zone player 200 to communicate over a wire with other devices in accordance with a communication protocol (e.g., IEEE 802.3). In some embodiments, a zone player includes both of the interfaces 204 and 206. In some embodiments, a zone player 200 includes only the wireless interface 204 or the wired interface 206.

In the illustrated example of FIG. 2, the processor 208 is a clock-driven electronic device that is configured to process input data according to instructions stored in memory 210. The memory 210 is a data storage that can be loaded with one or more software modules 214, which can be executed by the processor 208 to achieve certain tasks. In the illustrated example, the memory 210 is a tangible machine readable medium storing instructions that can be executed by the processor 208. In some examples, a task might be for the zone player 200 to retrieve audio data from another zone player or a device on a network. In some examples, a task might be for the zone player 200 to send audio data to another zone player or device on a network. In some examples, a task might be for the zone player 200 to synchronize playback of audio with one or more additional zone players. In some examples, a task might be to pair the zone player 200 with one or more zone players to create a multi-channel audio environment (e.g., the zone players 116-120 from FIG. 1). Additional or alternative tasks can be achieved via the one or more software modules 214 and the processor 208.

In the illustrated example of FIG. 2, the audio processing component 212 can include one or more digital-to-analog converters (DAC), an audio preprocessing component, an audio enhancement component or a digital signal processor, and so on. In some examples, the audio that is retrieved via the network interface 202 is processed and/or intentionally altered by the audio processing component 212 (e.g., filtered, polarity switched, level adjusted, etc.). Further, audio processing component 212 can produce analog audio signals. The processed analog audio signals are then provided to the audio amplifier 216 for play back through speakers 218. In addition, the audio processing component 212 can include necessary circuitry to process analog or digital signals as inputs to play from zone player 200, send to another zone player on a network, or both play and send to another zone player on the network. An example input includes a line-in connection (e.g., an auto-detecting 3.5 mm audio line-in connection).

The audio amplifier 216 is a device that amplifies audio signals to a level for driving one or more speakers 218. The one or more speakers 218 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

In certain examples, the zone player 200 includes the audio amplifier 216 and speakers 218. In certain examples, the zone player 200 includes the example audio amplifier 216 to power a set of detached speakers. The speakers can include, for example, any type of loudspeaker. Such an example zone player 200 can communicate a signal corresponding to audio content to the detached speakers via wired and/or wireless channels. In certain examples, the example zone player 200 does not include an amplifier, but allows a receiver, or another audio and/or video device with built-in amplification, to connect to a data network 128 of FIG. 1 and to play audio received over the data network 128 via the receiver and a set of detached speakers. The detached speakers can receive audio content via a wired coupling or a wireless communication channel between the detached speakers and, for example, the example zone player 200 and/or the receiver.

Returning to FIG. 2, in certain examples, the example zone player 200 includes sensor module(s) 220. The example sensor module 220 of FIG. 2 includes an accelerometer to detect how the zone player 200 is oriented. In certain examples, the accelerometer device is a three axes accelerometer. Based on the orientation of the zone player 200, the sound output from the zone player 200 or another zone player(s), whose sound may depend on the orientation of the zone player 200, may be shaped.

In certain examples, other types of sensors may be employed to detect position and orientation of the zone player 200. For example, a sensor may be used to determine speaker position relative to any of: a floor, wall, and ceiling. This information may be used to, for example, determine the speaker height relative to a listener in a room or the speaker distance from a wall or corner, and based on that information, an audio characteristic of one or more playback devices may be determined. For example, an audio characteristic of one playback device might be determined, or an audio characteristic of any of a number of different playback devices within a local area may be determined to better optimize the sound environment based on the orientation.

Example zone players include a "Sonos® S5," "Sonos SUB," "Sonos PLAY:5," "Sonos PLAY:3," "ZonePlayer 120," and "ZonePlayer 90," which are offered by Sonos, Inc. of Santa Barbara, California. Any other past, present, and/or future zone players can additionally or alternatively be used to implement the zone players of example embodiments disclosed herein. A zone player can also be referred to herein as a playback device, and a zone player is not limited to the particular examples illustrated herein. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some examples, a zone player can relay one or more signals received from, for example, a first zone player to another playback device. In some examples, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

IV. Example Subwoofer Playback Device

Figure 3:
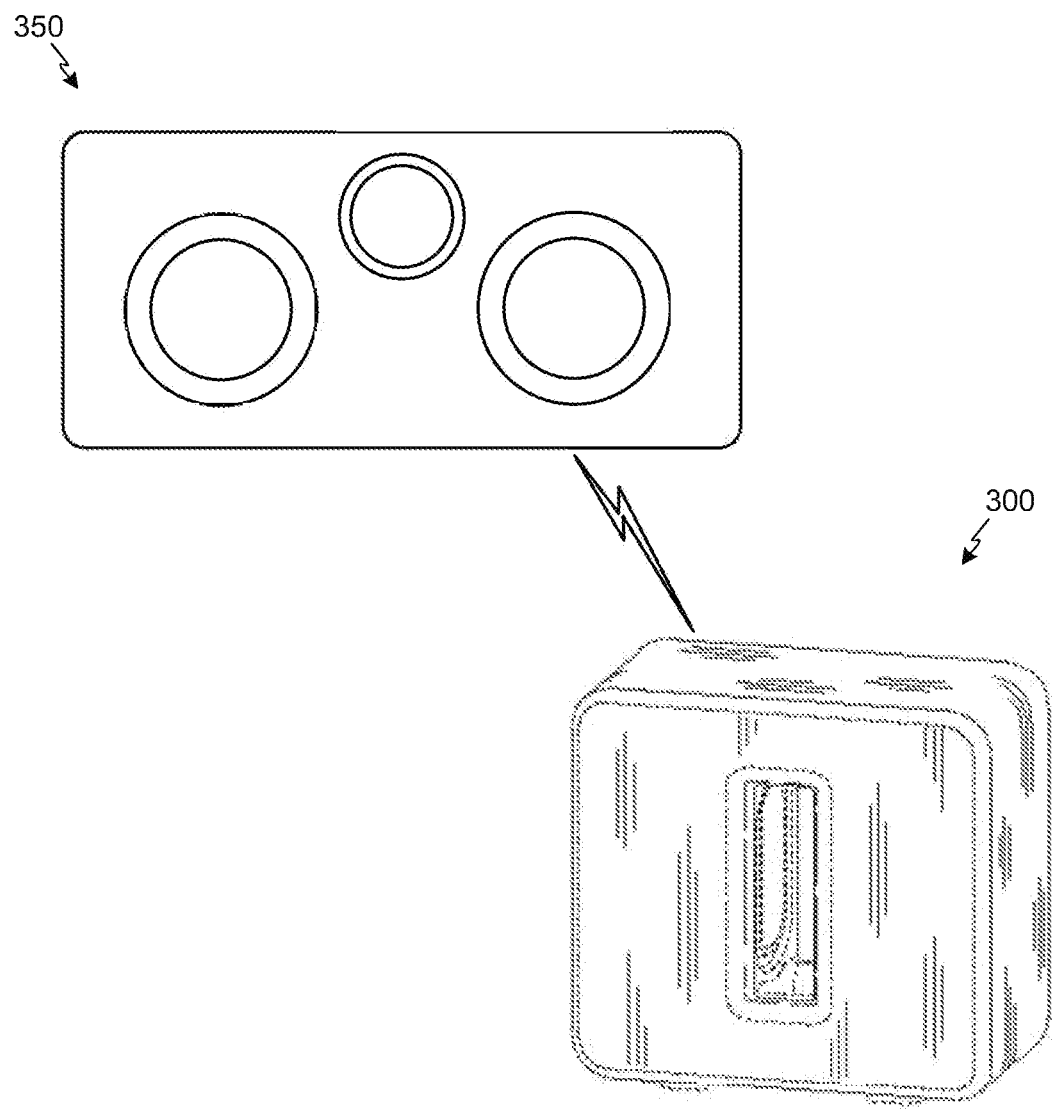
FIG. 3 shows an illustration of an example subwoofer.

FIG. 3 shows an example zone player 350 (e.g., zone player 200 of FIG. 2) combined with (e.g., bonded to, paired with) subwoofer 300. Subwoofer 300 is also a playback device like zone player 350, but designed to reproduce low frequency sound. Subwoofer 300 may be added to the zone or area of zone player 350 to play the lower frequency components while zone player 350 plays the midrange to higher frequency components. Alternatively, zone player 350 may be moved to or added to the zone or area that contains subwoofer 300. Subwoofer 300 may be paired to operate with zone player 350 via a wired or wireless network, such as described above. The process of adding subwoofer 300 to a zone and/or pairing it to a player like zone player 350 can be performed by a set up wizard-like software program that guides the user through the set up process. For example, the subwoofer 300 may be plugged into a standard wall outlet for electrical power and then joined to zone player 350 wirelessly or wired using a wireless controller, such as described above. A similar process may be performed to add (e.g., bond, pair) zone player 350 to subwoofer 300.

In some embodiments, once subwoofer 300 is added by the user to the system, zone player 350 and subwoofer 300 may each store an updated state variable that indicates the two have been set up to play audio together. For example, zone player 350 knows that it is paired with subwoofer 300 based on its stored state variable. Similarly, subwoofer 300 knows that it is paired with zone player 350 based on its stored state variable. In some embodiments, only zone player 350 contains an updated state variable that identifies it has been paired with subwoofer 300, and therefore zone player 350 may pass certain kinds of information to subwoofer 300 over the network connection (e.g., data network 128).

In some embodiments, zone player 350 may be configured to send the lower frequencies of the audio track to subwoofer 300 over the network connection. In some embodiments, the opposite may be true where it is subwoofer 300 that sends the midrange and higher frequencies of the audio track to zone player 350. In some embodiments, the entire audio spectrum is received at both zone player 350 and subwoofer 300, and each device (e.g., zone player 350 and subwoofer 300) filters the full-frequency signal according to its playback capabilities and/or settings.

As described above in connection with the zone player 200 from FIG. 2, an audio track received by the zone player 200 to playback is processed by the example audio processing circuit 212. In the illustrated example of FIG. 4, the example audio processing circuit 212 includes a crossover network 420, a phase controller 430 and a level controller 440.

Most individual speakers are unable to cover the entire audio spectrum from low frequency to high frequency without distortion or varying volume levels. To address this deficiency in sound reproduction, many playback systems use a combination of speakers (e.g., subwoofer, tweeter, etc.) designed to output different frequency ranges. The illustrated example crossover network 420 receives an audio track and directs separate frequency ranges of the audio track to playback by a zone player 200. For example, the example crossover 420 directs the low frequencies of the audio track to a subwoofer, the high frequencies to a tweeter and/or the mid-range frequencies to a mid-range speaker. In some examples, the crossover network 420 attenuates received frequencies outside the frequency range of the speaker. Thus, each speaker (e.g., driver) type receives a frequency range it is optimized to output.

However, the frequencies output by the speaker may contain some residual frequencies outside the frequency range of the speaker due to a "rolling off" effect of the filters used. For example, the filter used to separate the frequency ranges may allow frequencies within the range to pass through, but the attenuated frequencies outside the frequency range may also be output while the frequency transitions down. The overlapping frequencies may interfere with each other. For example, the low frequencies from the subwoofer and the mid-range frequencies from the mid-range speakers may overlap with each other at or around 80 Hertz (Hz). Depending on the placement of the playback devices (e.g., subwoofer and mid-range speakers) relative to each other and to the listener, the overlapping frequencies may arrive at the listener's ears at different times. When the sound arrives at different times, the overlapping frequencies may destructively interfere and result in inconsistencies in the sound received by the listener such as, for example, varying volume levels over the audio spectrum (e.g., canceling each other out).

Figure 4:
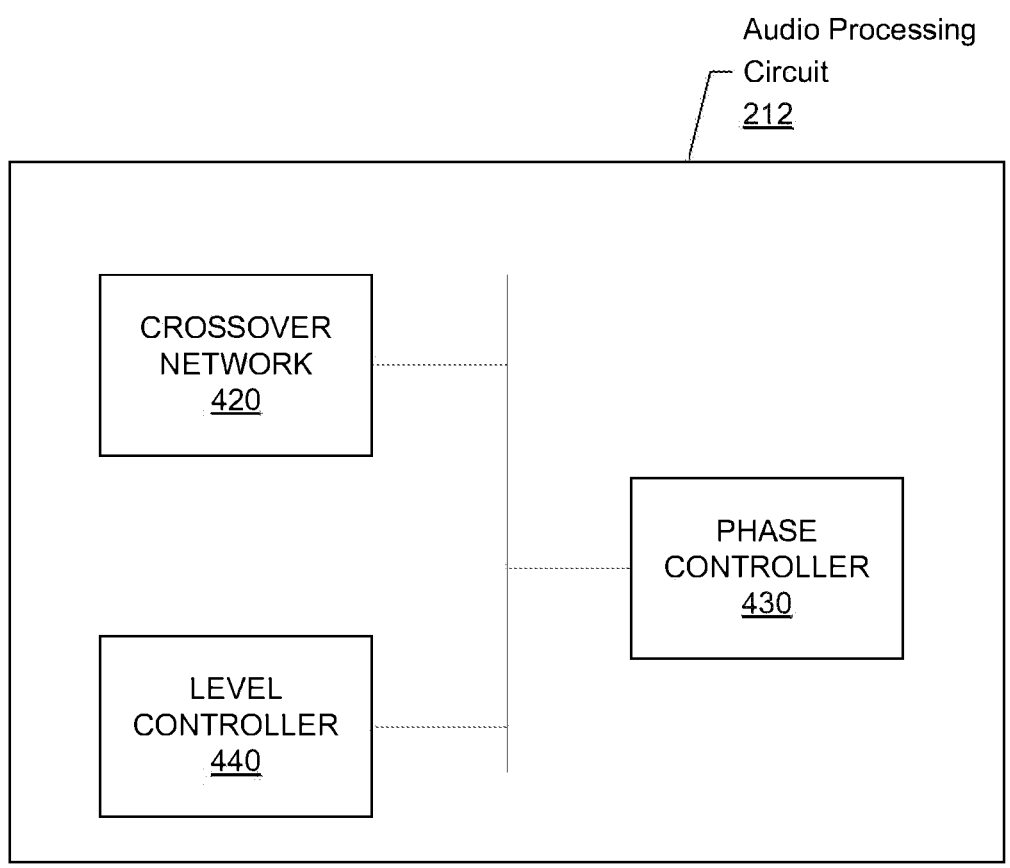
FIG. 4 is an example implementation of the audio processing circuit of FIG. 2.

The example phase controller 430 of the illustrated example audio processing circuit 212 of FIG. 4 enables adjusting the arrival time of the audio from a playback device such as, for example, a subwoofer. For example, the subwoofer may be in synchronization (e.g., 0 degree phase)

relative to the mid-range speakers or may be 180 degrees out of phase relative to the mid-range speakers. Alternate phase differences are also possible. In some examples, the phase controller 430 operates by reversing a polarity of the subwoofer. In some examples, the phase controller 430 operates by reversing the polarity of the mid-range speakers. In some examples, a variable control phase controller 430 allows continuous adjustment of the phase difference of the subwoofer between 0 degrees in phase and 180 degrees out of phase with respect to, for example, the mid-range speakers.

The example level controller 440 of the example audio processing circuit 212 of FIG. 4 enables adjustment of the level setting (e.g., volume) of the playback device (e.g., the example zone player 200). As a result, the output amplitude from the speakers may match over the different frequency ranges. For example, the subwoofer level setting may be adjusted to match the level setting of the mid-range speaker, for example, at or around the crossover frequency. By doing so, an even (e.g., consistent) sound may be experienced over the entire audio spectrum from the playback system. In some examples, a music listener may prefer more bass (e.g., low frequencies) and the example level controller 440 may adjust, for example, the subwoofer level setting so the low frequency volumes (e.g., levels, output amplitudes) are louder than the higher frequency volumes.

Rather than requiring a user to understand each subwoofer equalization setting and how adjusting one setting (e.g., crossover frequency) could impact the overall sound of the playback system, calibrating subwoofer equalization settings to improve or maximize the sound production of a playback system can be facilitated by automatically calibrating the subwoofer configurations based on a user selecting a user-preferred tone set from a series of tones (e.g., frequencies) generated by the subwoofer and at least one other zone player based on the particular audio characteristics of the playback system and listening zone.

V. Example Controller

Figure 5:
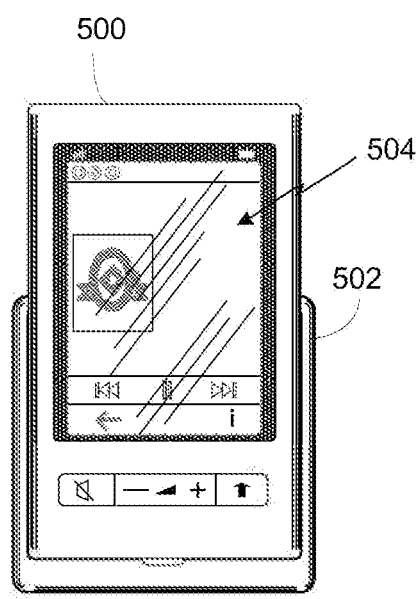
FIG. 5 shows an illustration of the example controller.

FIG. 5 shows an example illustration of a wireless controller 500 in a docking station 502. The controller 500 can correspond to the controlling device 130 of FIG. 1. The controller 500 is provided with a touch screen 504 that allows a user to interact with the controller 500, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 500 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, California. The flexibility of such an application and its ability to be ported to a new type of portable device is advantageous.

Figure 6:
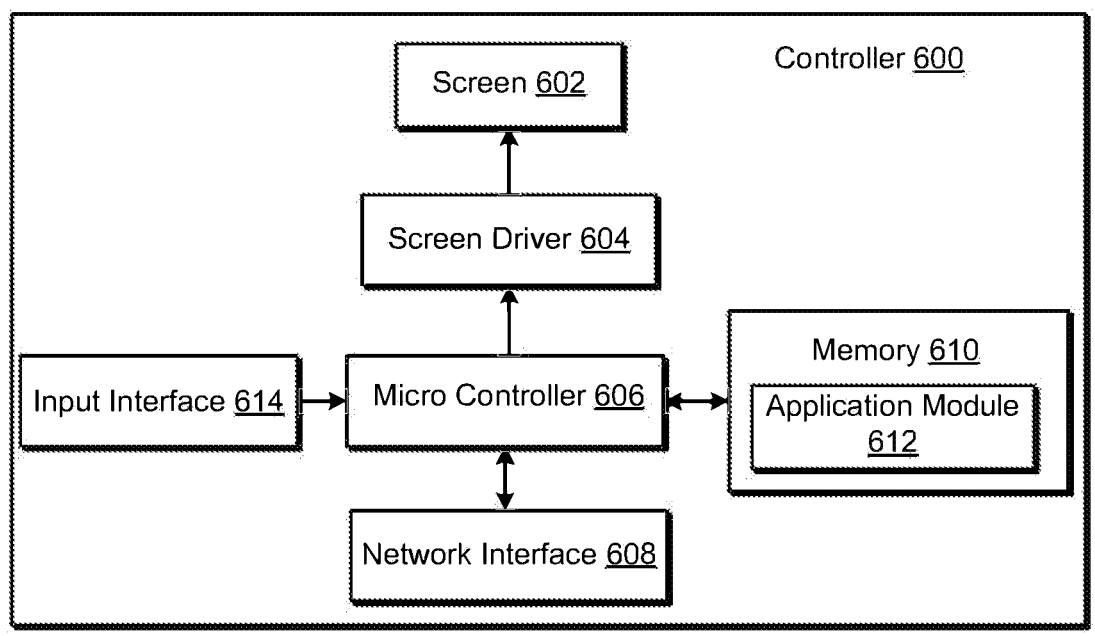
FIG. 6 is an example implementation of the example controller.

Referring now to FIG. 6, there is shown an example controller 600, which can correspond to the controlling device 130 in FIG. 1. The controller 600 can be used to facilitate the control of multi-media applications, automation and others in a system. In particular, the controller 600 is configured to facilitate a selection of a plurality of audio sources available on the network and enable control of one or more zone players (e.g., the zone players 102-124 in FIG. 1) through a wireless network interface 608. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 600 or being played via a zone player, a picture (e.g., album art) or any other data, associated with the audio source can be transmitted from a zone player or other electronic device to the controller 600 for display.

The controller 600 is provided with a screen 602 and an input interface 614 that allows a user to interact with the controller 600, for example, to navigate a playlist of many multimedia items and to control operations of one or more zone players. The screen 602 on the controller 600 can be an LCD screen, for example. The screen 600 communicates with and is commanded by a screen driver 604 that is controlled by a microcontroller (e.g., a processor) 606. The memory 610 can be loaded with one or more application modules 612 that can be executed by the microcontroller 606 with or without a user input via the user interface 614 to achieve certain tasks. In some embodiments, an application module 612 is configured to facilitate grouping a number of selected zone players into a zone group and synchronizing the zone players for audio play back. In some embodiments, an application module 612 is configured to control the audio sounds (e.g., volume) of the zone players in a zone group. In operation, when the microcontroller 606 executes one or more of the application modules 612, the screen driver 604 generates control signals to drive the screen 602 to display an application specific user interface accordingly.

The controller 600 includes a network interface 608 that facilitates wireless communication with a zone player. In some embodiments, the commands such as volume control and audio playback synchronization are sent via the network interface 608. In some embodiments, a saved zone group configuration is transmitted between a zone player and a controller via the network interface 608. The controller 600 can control one or more zone players, such as 102-124 of FIG. 1 and zone player 300 of FIG. 3. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 600. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 600, the signals or data of increasing the audio volume for the group are sent to one of the zone players and causes other zone players in the group to be increased together in volume.

A user via the controller 600 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

VI. Subwoofer Auto-Calibration

Figure 7:
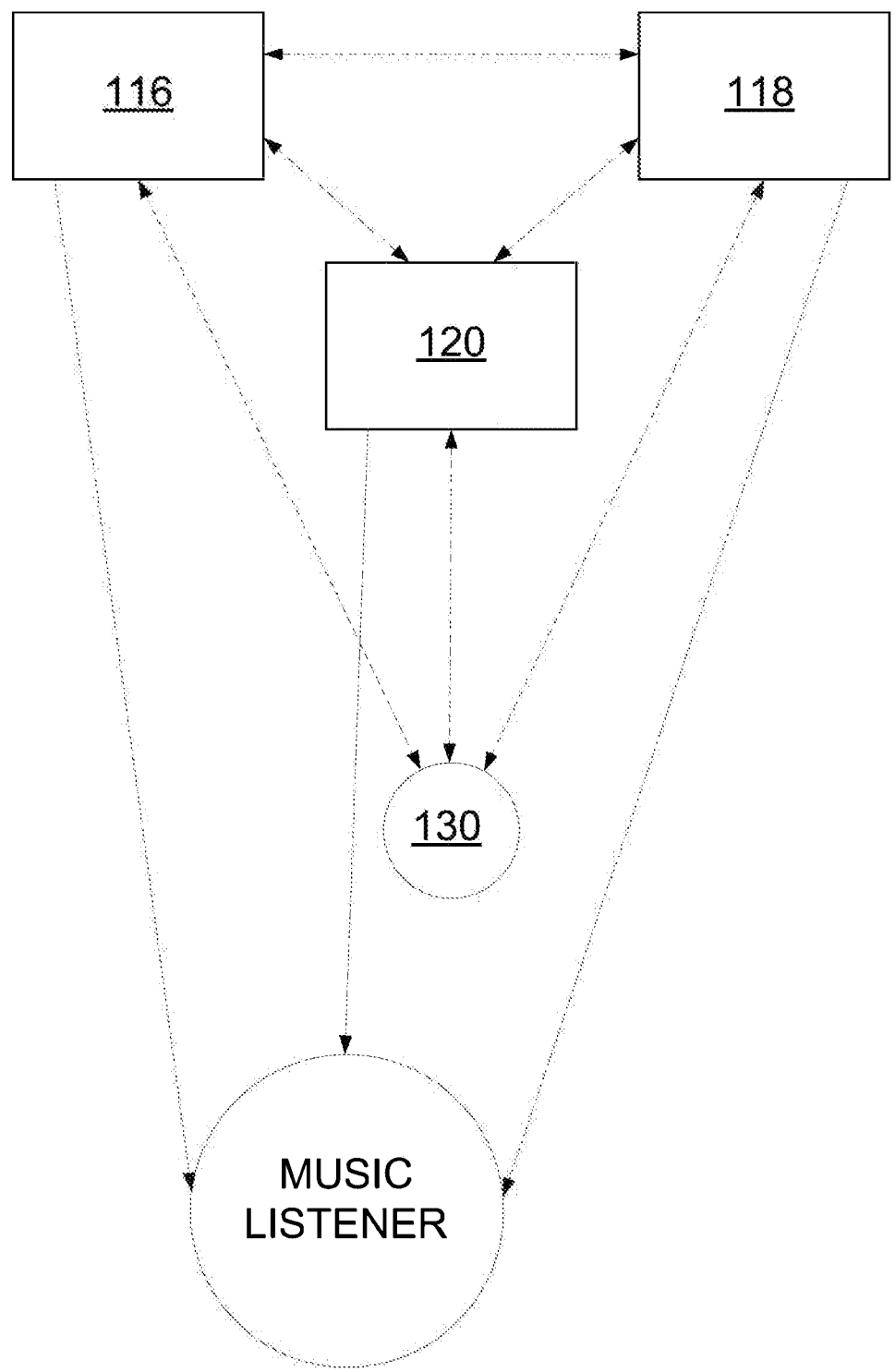
FIG. 7 shows an illustration of an example zone of FIG. 1.

FIG. 7 is an illustrated example of the home theater room from FIG. 1, where three or more zone players (e.g., zone players 116, 118 and 120) can be configured to play various channels of audio that is encoded with three channels or more sound. If the sound is encoded as 2.1 channel audio in the paired playback system, then the zone player 116 can be configured to play left channel audio, the zone player 118 can be configured to play right channel audio, and the zone player 120 can be configured to play bass frequencies. In the illustrated example, the bass frequencies may also be played by the example subwoofer 300 of FIG. 3. The user controls the playback system via the example controller 130. Audio output from the example zone players 116-120 is received by the user. Additionally, the example controller 130 communicates with the zone players 116-120 via a network interface.

Figure 8:
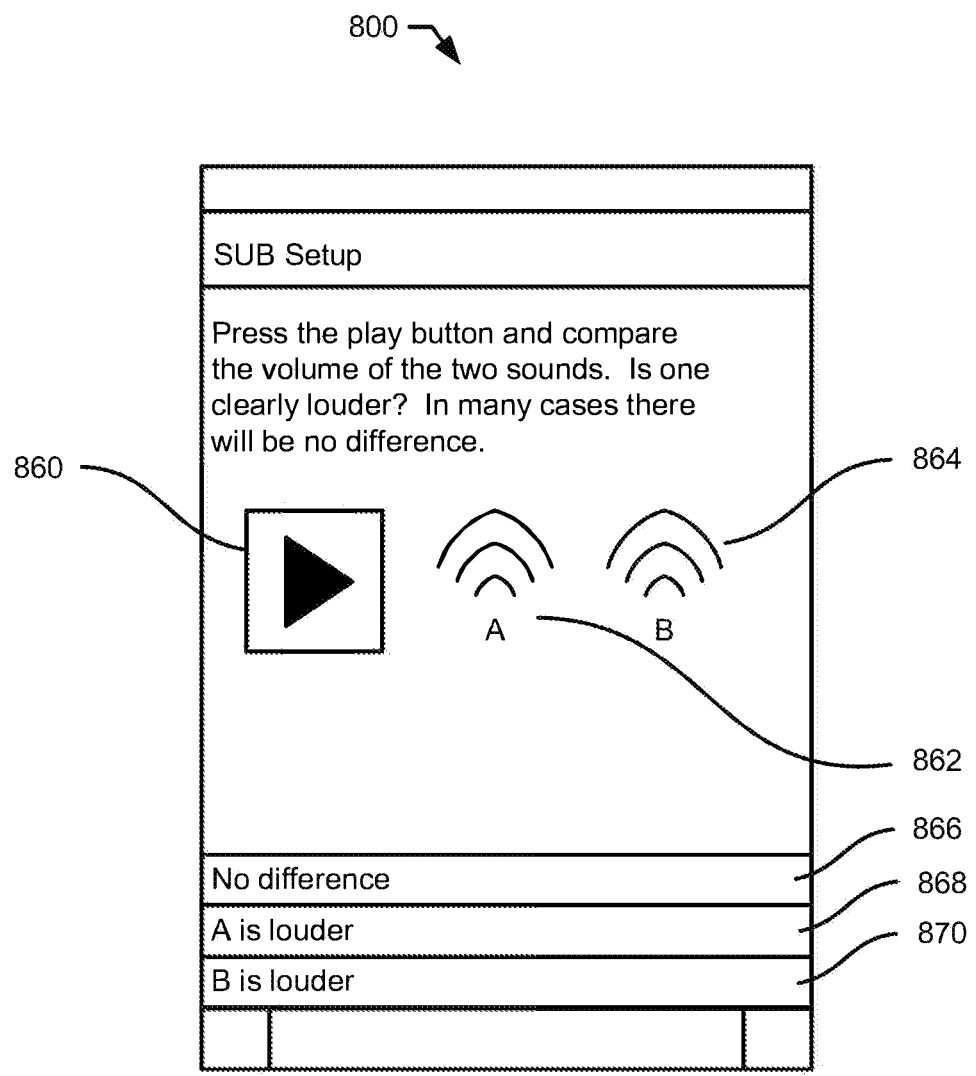
FIG. 8 shows an example interface in an embodiment to allow a user to identify a preferred tone set.

FIG. 8 depicts an example controller user interface 800 to calibrate a subwoofer (e.g., the example subwoofer 120 of FIG. 6). Via the controller interface 800, a user may select a tone set (e.g., series of test frequencies/tones) that sounds louder. By identifying the louder sounding tone set, the music listener unknowingly, or with very little effort, identifies the preferred phase difference between the zone player 120 relative to the zone players 116 and 118. For example, a tone set includes a series of tones included in the audio spectrum output by the subwoofer 120 and by the mid-range drivers or speakers in the zone players 116 and 118.

In the illustrated example of FIG. 8, the controller user interface 800 includes control buttons 860, 866, 868 and 870, and indicators 862 and 864. In some examples, control buttons 860, 868 and 870 may be located on the playback device (e.g., zone players 102-124). For example, a physical button may be located on the playback device. In some examples, a user interface such as, for example, the controller user interface 800 is located on the playback device (e.g., zone players 102-124). The example control button 860 is used to control the currently playing sound. For example, when a tone set is playing from the paired playback system (e.g., zone players 116-120), control button 860 displays a "Pause" icon. Selection of the example control button 860 while the Pause icon is displayed on the controller interface 800 pauses the tone set playback and changes the example control button 860 to display a "Play" icon. In the illustrated example, the user selects between two tone sets. The example indicators 862 and 864 identify which tone set is currently playing. For example, while test set A is playing, example indicator 862 may be highlighted. Alternatively, other indicators to identify which tone set is playing are also possible (e.g., example indicators 862 and 864 flash or blink while a test sound is playing).

Figures 9, 10:
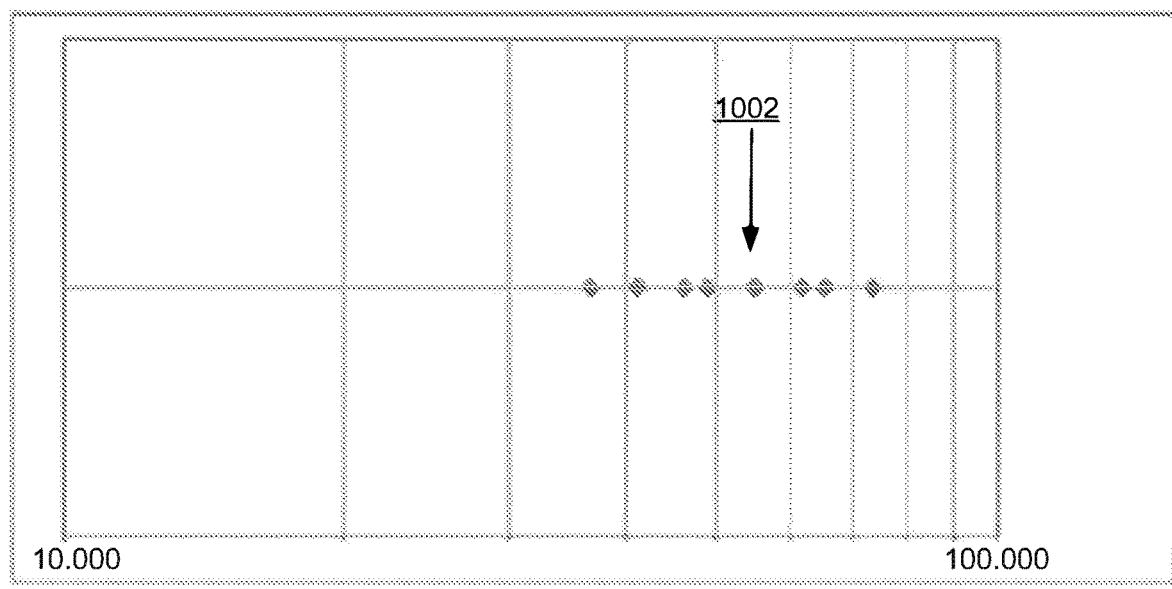
FIG. 9 is an example table illustrating an example tone set of FIG. 8.
FIG. 10 is an example graph illustrating the example tone set of FIG. 9.
Figure 11:
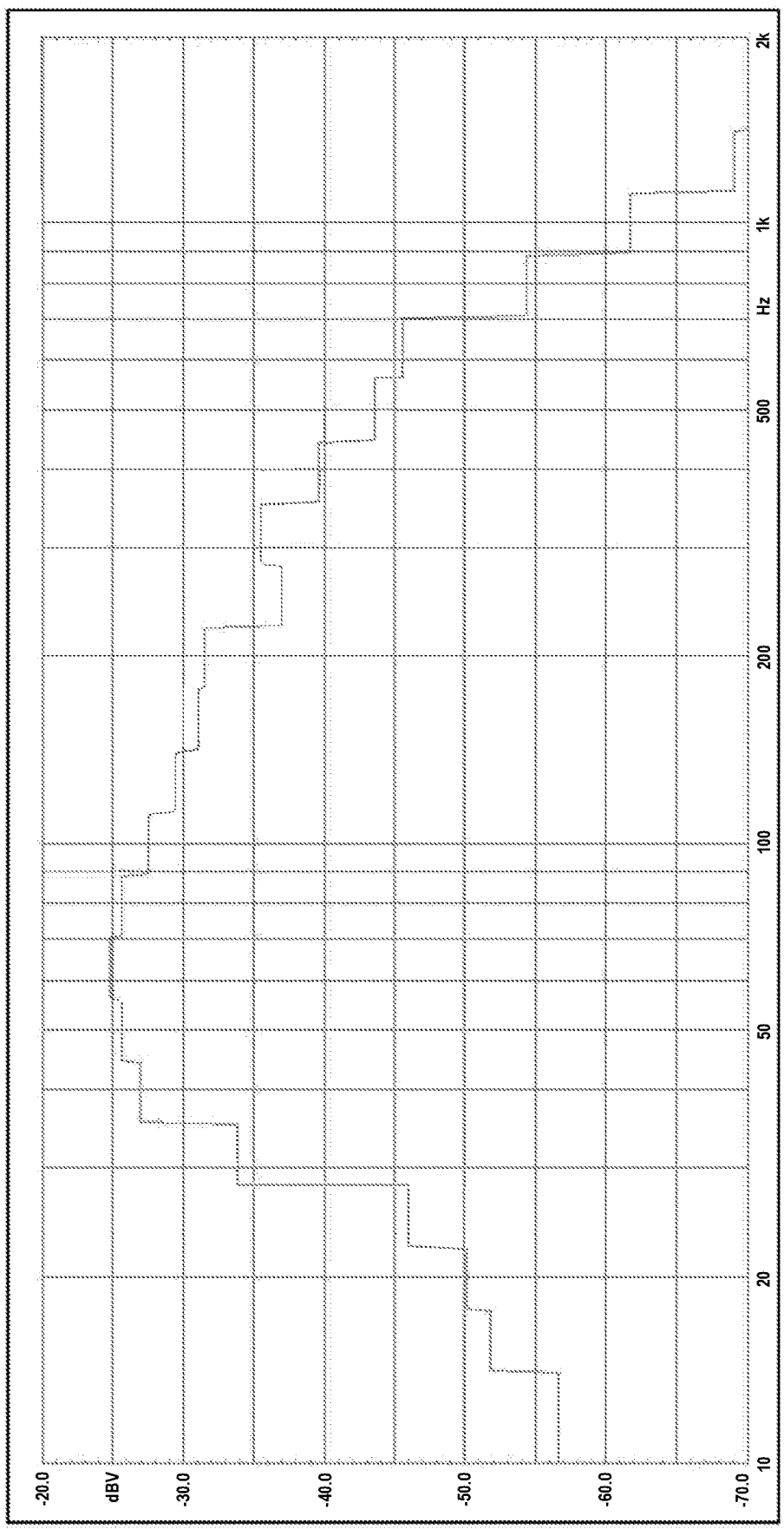
FIG. 11 is an example graph illustrating an example audio spectrum of the example tone set of FIG. 9.

In the illustrated example, the user selects between test set A and test set B. The example test set A includes eight different fundamental tones (e.g., frequencies) played in a series. The example table of FIG. 9 is an example tone set including eight different tones (e.g., fundamental frequencies). During playback, test set A may play the series of tones from highest frequency to lowest frequency (e.g., 73.416 Hz down to 36.708 Hz). In other examples, playback of test set A may include playing the series of eight tones from lowest frequency to highest frequency (e.g., 36.708 Hz up to 73.416 Hz). In other examples, test set A may include playback of a subset of tones selected from a series of tones. In other examples, test set A may include playback of a different number of tones (e.g., playback of one frequency, ten frequencies, etc.). FIG. 10 is an example graph illustrating the example series of eight different tones from the example table of FIG. 9. For example, point 1002 on the example graph corresponds to the tone 902 (55.000 Hz) in the example table of FIG. 9.

Playback of the example eight tones of FIG. 9 represents only a subset of the full audio spectrum. For example, if zone player(s) 116 and/or 118 include only tweeter drivers (e.g., output only high frequencies), then reproduction of the tones in test set A from the zone player(s) 116 and/or 118 may sound less than optimal (e.g., distorted). To cover the entire audio spectrum, playback of test set A includes the eight fundamental frequencies (e.g., the eight different tones of FIG. 9) and the corresponding harmonic tones. A harmonic tone of a fundamental frequency is an integer multiple of the fundamental frequency. For example, the harmonic tones of tone 902 from FIG. 9 (55.000 Hz) include: 110.000 Hz, 165.000 Hz, 220.000 Hz, etc. As a result, playback of test set A covers a frequency range above and below the crossover frequency. Via the example crossover network 420 of FIG. 4, the low frequencies (e.g., below the crossover frequency) may be directed to a subwoofer (e.g., subwoofer 120), and the high frequencies (e.g., above the crossover frequency) may be directed to a mid-range and/or full-range speaker (e.g., zone player(s) 116 and/or 118). FIG.

11 is an example snapshot illustrating the audio spectrum of the tones of FIG. 9 and the corresponding harmonic tones (e.g., the audio input to play).

As described above in connection with the example controller user interface 800 of FIG. 8, the user selects the louder sounding tone set between two tone sets (e.g., test set A and test set B). During playback of test set A, the subwoofer 120 outputs the series of tones in synchronization (e.g., 0 degrees offset) relative to the output of the series of tones by zone players 116 and/or 118. In the illustrated example, test set B includes the same series of fundamental frequencies and harmonic tones as test set A, but is played by either the subwoofer or the mid-range speakers with a reversed polarity. For example, during playback of test set B, the example subwoofer 120 outputs the same series of tones (e.g., the eight fundamental frequencies from the example table of FIG. 9 and the corresponding harmonic tones) with phase 180 degrees offset relative to the output of the series of tones from the example zone players 116 and/or 118. In some examples, when the phase difference is at a first phase difference (e.g., 0 degrees offset), the overlapping frequencies output by the subwoofer 120 and the mid-range speakers of zone players 116 and 118 destructively interfere (e.g., cancel) and the overlapping frequencies are not heard as well by the user (e.g., reduced in volume). In some examples, when the phase difference is at a second phase difference (e.g., 180 degrees offset) relative to the zone players 116 and 118, the overlapping frequencies constructively interfere and the sound level at those frequencies is louder. The example subwoofer 120 is able to set the phase difference in the subwoofer configuration based on the tone set (e.g., test set A or test set B) selected by the user.

Figure 12:
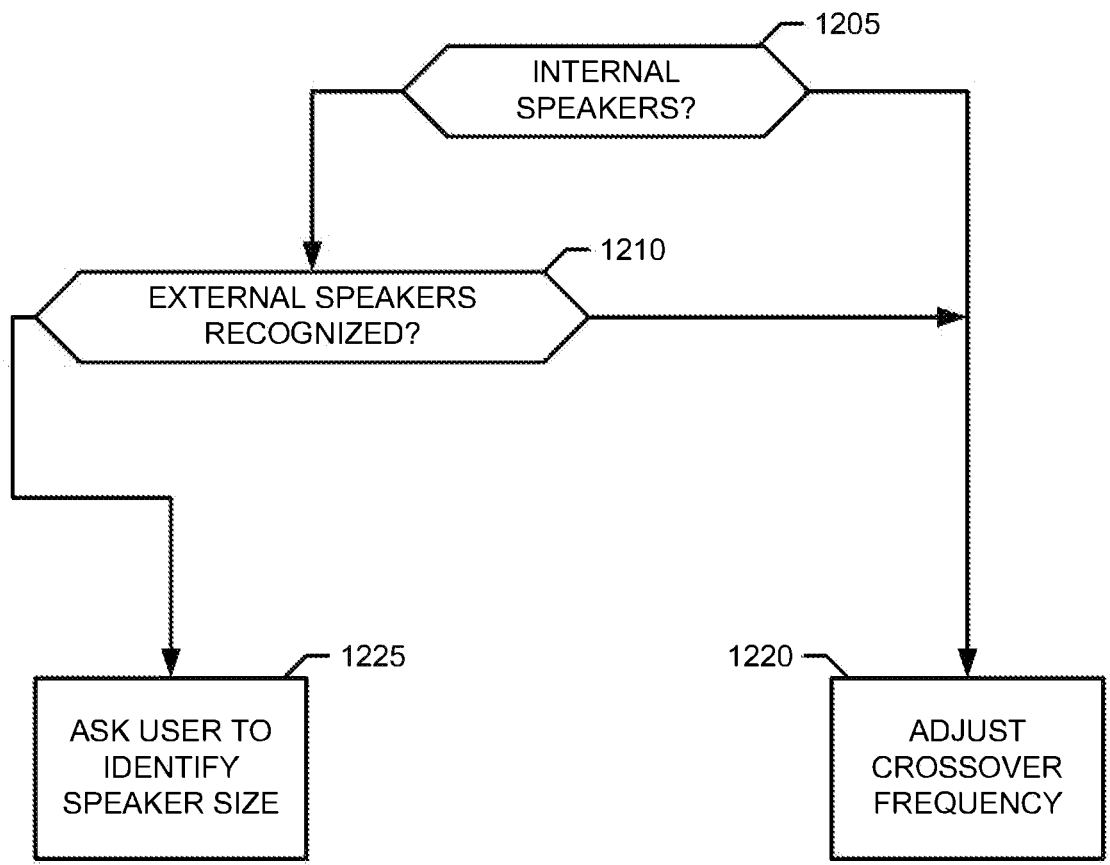
FIG. 12 is a flowchart representative of example machine readable instructions that may be executed to implement the example crossover frequency identification.

In some examples, test sets A and B output a series of tones at or near the crossover frequency. A flowchart representative of example machine readable instructions to identify a crossover frequency of a paired playback system (e.g., zone players 116, 118 and 120) is shown in FIG. 12. In this example, the machine readable instructions comprise a program for execution by a processor such as the processor 1512 shown in the example computer 1500 discussed below in connection with FIG. 15. The program may be embodied in software stored on a tangible computer readable medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 12, many other methods of implementing the example crossover frequency identification may be used. For example, the order of execution of the blocks may be changed, and/or some of the blocks described may be changed, eliminated, or combined.

The example program 1200 of FIG. 12 begins by identifying whether the zone player(s) in the paired playback system include internal speakers (block 1205). When the zone players (e.g., zone players 116 and/or 118) include internal speakers, then the example program 1200 automatically adjusts the crossover frequency of the subwoofer configuration (block 1220). For example, the example program 1200 determines the subwoofer 120 in the paired playback system is bonded (e.g., paired) with a zone player including the example audio amplifier 216 and example speakers 218 of FIG. 2. In the example of FIG. 12, the example program 1200 is able to identify the acoustic characteristics (e.g., frequency response, 3 dB rolloff, Q, SPL at 1 watt, etc.) of the zone players 116 and/or 118. For example, the example program 1200 receives the acoustic characteristics (or parameters) from the respective zone players. Alternatively and/or additionally, the example program 1200 searches a database of known acoustic characteristics either locally stored (e.g., within the playback system of system configuration 100 of FIG. 1) or stored externally of the playback system through a network (e.g., network 128).

When the zone players 116 and 118 bonded with (e.g., paired to) the subwoofer 120 do not include internal speakers, in the illustrated example of FIG. 12, the example program 1200 determines whether the external speakers are recognized (block 1210). For example, the external speakers are registered in a database and the crossover frequency can be found based on the known acoustic characteristics (e.g., frequency response, etc.). When the external speakers are recognized, the crossover frequency of the zone players in the paired playback system is automatically identified by the program 1200 (block 1220).

In the illustrated example of FIG. 12, when the external speakers are not recognized by the example program 1200, then the user is prompted to identify the external speaker size via a controller user interface such as, for example, the controller interface 800 of FIG. 8 (block 1225). For example, the user is prompted to identify whether the external speakers are "Small," "Medium," or "Large." In some examples, icons representing the speaker sizes may be displayed via the controller user interface 800 to the user. In some examples, once the external speaker size is known, then a predetermined crossover frequency is set. For example, when the external speakers are Medium sized, then the crossover frequency is set as 80 Hz. Alternate predetermined crossover frequencies are also possible. The crossover frequency is then stored with the subwoofer configuration.

Returning to the example controller interface 800 of FIG. 8, during playback of a tone set (e.g., tone set A or tone set B), the subwoofer 120 outputs the subset of the tone set A audio spectrum (e.g., fundamental frequencies and harmonic tones) at and below the crossover frequency and the remaining playback devices in the paired playback system (e.g., zone player 116 and/or 118) outputs the subset of the tone set A audio spectrum at and above the crossover frequency based on the crossover frequency of the paired playback system recalled from the subwoofer configuration. In the illustrated example, the tone set continuously alternate playing tone set A and tone set B until the user makes a selection via the example controller interface 800. Depending on which tone set the user identified as sounding louder, the respective phase difference is stored in the subwoofer configuration. Additionally, when the user is unable to identify which tone set sounds louder, the user may select "No Difference" (e.g., control button 866) and a default phase difference is stored in the subwoofer configuration. Thus, the phase difference and crossover frequency are calibrated by simply asking the user which of two tone sets (e.g., test set A or test set B) sounds louder to the user.

Figure 13:
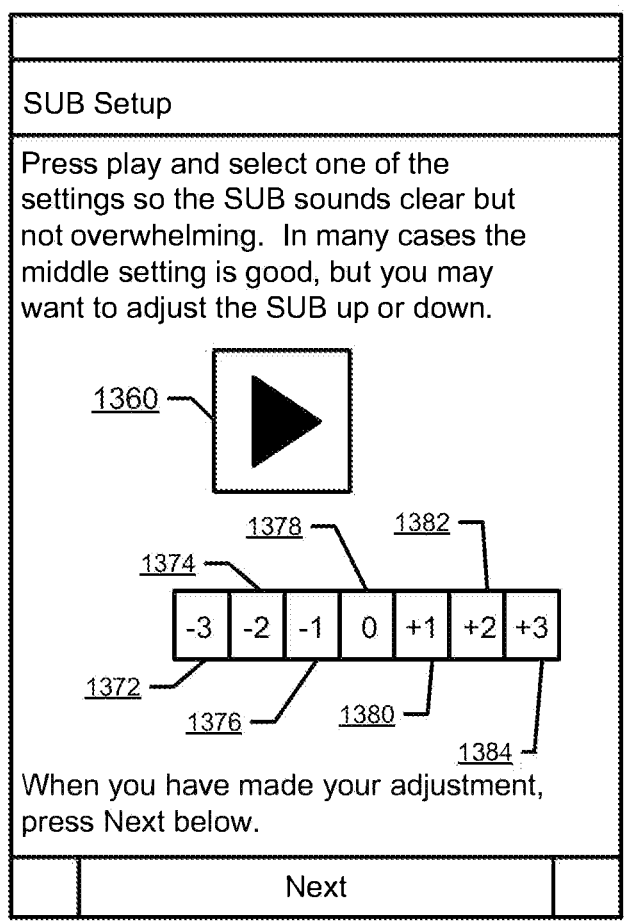
FIG. 13 shows an example interface in an embodiment to allow a user to identify a preferred tone set.

FIG. 13 illustrates an example controller user interface 1300 facilitating subwoofer level configuration. In the illustrated example, the subwoofer level may be adjusted to match the output amplitude of the zone players 116 and 118, and to correct any response irregularities due to the environment. For example, zone players located near solid walls increase the level of bass heard by the user. As a result, an unbalanced subwoofer level may overwhelm the output amplitude of the other frequency ranges (e.g., mid-range frequencies). In the example controller user interface 1300 of FIG. 13, the user is asked to identify a user-preferred tone set via the example controller user interface 1300.

In the example controller user interface 1300, the control button 1360 toggles between Play and Pause similar to the example control button 860 of FIG. 8. In the illustrated example, the soft buttons 1372-1384 allow the user to adjust the subwoofer level (e.g., gain) of the subwoofer 120. The tone set is generated (e.g., calculated) by the subwoofer 120 based on the identified audio characteristics (e.g., crossover frequency, phase difference) of the paired zone player(s) (e.g., paired playback system) and recalled from the subwoofer configuration. When the tone set is playing, a series of tones at or around the crossover frequency is output from the zone players of the paired playback system (e.g., the subwoofer 120 and the zone players 116 and 118). The user may then adjust the subwoofer level based on a level preference or what sounds better to the user. For example, the user may prefer a louder bass volume while listening to an audio track and increase the subwoofer level by selecting the example soft button 1382. In some examples, the level at the mid-point (e.g., the example soft button 1378) is based on the stored crossover frequency and phase difference. In some examples, the mid-point (e.g., the example soft button 1378) is a predetermined value (e.g., +30 dB). In some examples, the soft buttons 1372-1384 correspond to adjusting the subwoofer level by increments (e.g., 3 dB increments). For example, selecting the example soft button 1382 may increase the subwoofer level by +6 dB. However, alternate sound level increments are also possible. In some examples, adjusting the subwoofer level depends on the speakers the subwoofer 120 is paired with. For example, the mid-point level of the subwoofer 120 may vary based on whether the speakers (e.g., zone players 116 and/or 118) are Small, Medium or Large. Alternatively and/or additionally, the sound level increments may also vary based on the paired speakers. In some examples, a database may be searched to determine if alternate level increments and/or mid-point levels are available. For example, the database may be stored locally in the subwoofer, locally within the playback system, and/or externally and accessed via the Internet. In the illustrated example of FIG. 13, when the user is finished making the subwoofer level adjustments, the user selects Next and the test sound stops playing. Additionally, the adjusted subwoofer level is stored in the subwoofer configuration.

In some examples, the subwoofer configuration, including the phase difference and subwoofer level setting, may be determined by asking the user to identify a preferred tone set (e.g., series of tones) output by the zone players in the paired playback system via a controller interface, such as, for example, the controller user interface 800 of FIG. 8. In some examples, the crossover frequency is determined and stored in the subwoofer configuration. For example, the example program 1200 of FIG. 12 is used to determine the crossover frequency. The subwoofer 120 then outputs a series of tones at a frequency at and around (e.g., above and/or below) the crossover frequency. In the illustrated example, the user is then asked to adjust the volume (e.g., as described above in connection with FIG. 13) until the series of tones is just (e.g., barely) audible. This step of playing a tone set via only the subwoofer 120 is then repeated at other frequencies above and/or below the crossover frequency, and the user is prompted to adjust the volume until the tones are just (e.g., barely) audible. Once the user has identified a plurality of subwoofer volume levels at varying frequencies, the user is then prompted to identify a plurality of volume levels just (e.g., barely) audible when output from the zone players 116 and 118. In the illustrated example, the plurality of volume settings of the subwoofer 120 and zone players 116 and 118 at and around (e.g., above and/or below) the crossover frequency enables identifying the relative response of the subwoofer 120 and zone players 116 and 118 in the zone (e.g., home theater zone) and then automatically calibrating the subwoofer equalization settings based on the plurality of volume levels.

In some examples, a method of calibrating the subwoofer configuration may be similar to the method asking the user to identify a plurality of volume levels just (e.g., barely) audible, but includes playing a wide band noise while also playing the tone set to minimize the impact any inherent noise in the room may affect the identified volume settings.

In some examples, an out of phase residual is used to identify the phase difference and subwoofer level settings of the zone players in the paired playback system (e.g., subwoofer 120 and zone players 116 and/or 118). For example, the user is asked to adjust the phase via the controller user interface until the combined sound from the zone players 116, 118 and 120 is just (e.g., barely) audible. In the illustrated example, the zone players 116-120 play a series of tones at or near the crossover frequency. The adjusted phase represents a phase difference at which the overlapping frequencies are destructively interfering and the subwoofer 120 and zone players 116 and 118 are out of phase with each other. At the chosen phase, the user is then prompted via the controller user interface to adjust the subwoofer level until the output sound from the zone players 116, 118 and 120 is just (e.g., barely) audible. This residual subwoofer level identifies the inherent offset of the subwoofer 120 relative to the zone players 116 and 118. By repeating these steps at a plurality of frequencies at and around (e.g., above and/or below) the crossover frequency, the subwoofer 120 may identify the ideal phase difference and subwoofer level settings of the zone players 116, 118 and 120 and store the settings in the subwoofer configuration. In the illustrated example, the phase and/or subwoofer levels may be adjusted through soft buttons such as, for example, the soft buttons 1372-1384 in FIG. 13. Alternatively and/or additionally, the phase and/or subwoofer levels may be adjusted through a soft graphical element on the controller user interface which may continuously adjust the settings (e.g., a soft dial, a slider, etc.).

In some examples, a dial calibration may be used to calibrate the subwoofer configuration of the subwoofer 120 in the paired playback system. For example, a soft dial may be provided to the user to adjust the subwoofer equalization settings. In the illustrated example, the user may rotate a finger along the screen of the controller interface to adjust the sound output from zone players 116, 118 and 120. For example, the top of the soft dial may represent the subwoofer 120 in 0 degree phase and the bottom of the soft dial may represent the subwoofer 120 in 180 degree phase relative to the zone players 116 and/or 118. In the illustrated example, as the user's finger rotates along the soft dial, the subwoofer level settings increase and then decrease and the user receives a plurality of combinations of phase difference and subwoofer level settings of the zone players in the paired playback system. When the user reaches a preferred sound, the phase difference and subwoofer level setting at that point are stored in the subwoofer configuration. In some examples, the crossover frequency may also be adjusted by rotating the soft dial. Alternate graphical elements to provide continuous adjustment of the settings (e.g., phase difference, subwoofer level, and/or the crossover frequency) may also be used such as, for example, a soft slider.

Figure 14:
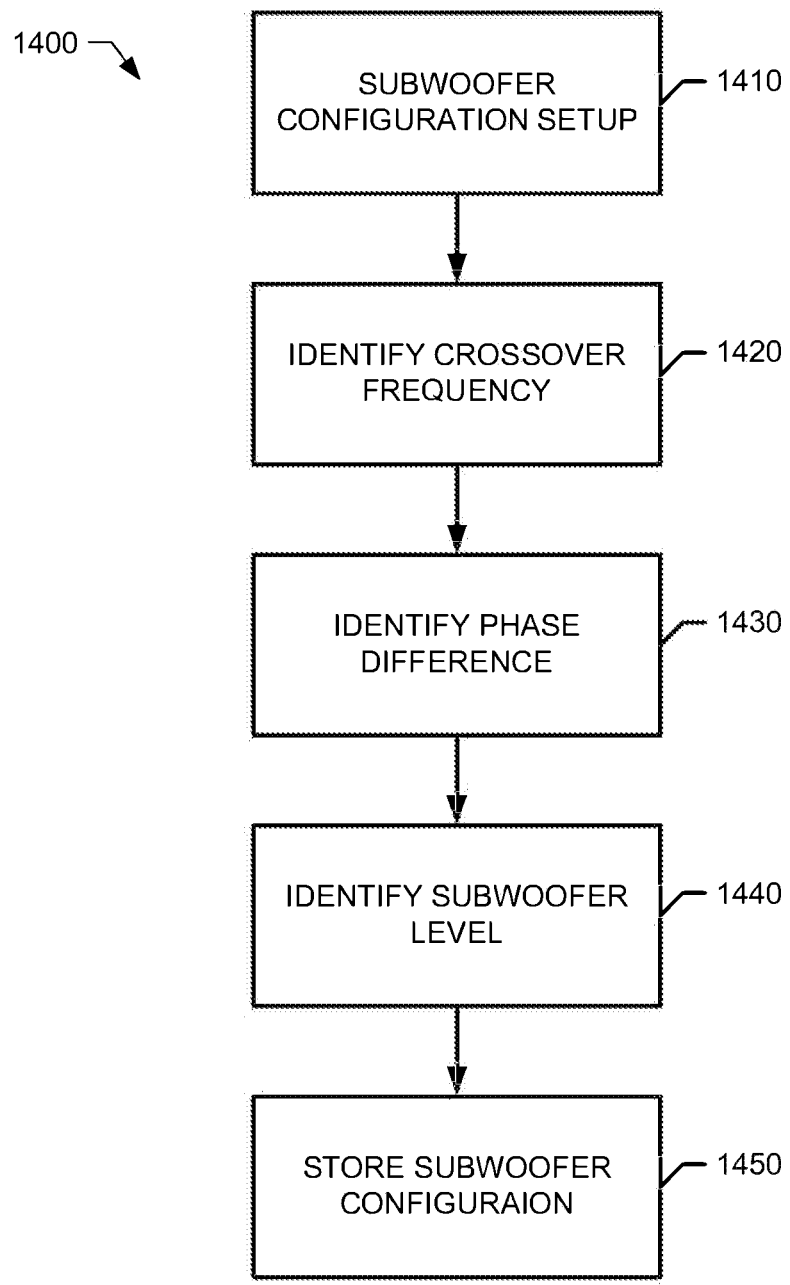
FIG. 14 is a flowchart representative of example machine readable instructions that may be executed to implement the example subwoofer calibration.

A flowchart representative of example machine readable instructions for calibrating subwoofer equalization settings (e.g., subwoofer configuration) is shown in FIG. 14. In this example, the machine readable instructions comprise a program for execution by a processor such as the processor 1512 shown in the example computer 1500 discussed below in connection with FIG. 15. The program may be embodied in software stored on a tangible computer readable medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 14, many other methods of implementing the example subwoofer configuration calibration may be used. For example, the order of execution of the blocks may be changed, and/or some of the blocks described may be changed, eliminated, or combined.

The example program 1400 of FIG. 14 begins by initiating subwoofer configuration setup (block 1410). In some examples, when a subwoofer 120 is paired with a zone player (e.g., zone players 116 and/or 118) in a listening zone, the user may be prompted to begin calibrating the subwoofer configurations. For example, when a new subwoofer 120 is added to the listening zone or when a subwoofer 120 is paired with a new and/or different listening zone or zone player, the user may be prompted to begin calibration and/or other configuration. In some examples, a user may initiate subwoofer configuration by using the controller interface to navigate to a subwoofer settings screen. In some such examples, the user may choose to recalibrate the subwoofer configuration or may choose to manually adjust the equalization settings. For example, the user may turn off or otherwise deactivate the subwoofer. Alternatively and/or additionally, the user may select a different and/or new speaker size paired to the subwoofer in the paired playback system. Additionally, the user may adjust overall equalization settings of the paired zone players (e.g., zone players 116-120) by increasing or decreasing the bass on all playback devices in the paired playback system.

In some examples, the subwoofer 120 includes a sensor module such as, for example, the example sensor module 220 of FIG. 2. In certain embodiments, the sensor module 220 of FIG. 2 includes an accelerometer to detect how the zone player 120, and in particular, how the speaker driver(s) of the zone player 120 are oriented. For example, the audio characteristics of the zone player 120 may be different when the zone player 120 is in a vertical mode than when in a horizontal mode. In some examples, when the orientation of the speakers of the zone player 120 is detected to have changed, the zone player 120 checks whether a stored subwoofer configuration exists of the current orientation. When the zone player 120 does not locate a stored subwoofer configuration of the current orientation, in some examples, the zone player 120 prompts the user via the controller user interface such as, for example, the example controller user interface 800 of FIG. 8, to recalibrate the subwoofer configuration.

In some examples, other types of sensors may be employed to detect position and orientation of the zone player 120. For example, the sensor module 220 of the example subwoofer 120 identifies that a subwoofer 120 has been moved to a new location (e.g., within the listening zone, to a new listening zone). In some such examples, the subwoofer 120 may prompt the user via a controller user interface to recalibrate the subwoofer configuration.

In the illustrated example of FIG. 14, when calibrating the subwoofer configuration has been initiated (e.g., via a new subwoofer or zone player pairing, by navigating to a subwoofer settings menu, by detecting a position/orientation change), the example program 1400 attempts to automatically identify the crossover frequency of the zone players in the paired playback system (block 1420). In some examples, the example program 1400 calculates a crossover frequency by identifying the paired speaker's size. In some examples, the example program 1400 may prompt the user to identify the speaker size (e.g., small, medium, large) of the zone player(s) bonded to the subwoofer and a crossover frequency is calculated based on the speaker size. The identified crossover frequency is stored in a subwoofer configuration.

In the illustrated example of FIG. 14, calibrating the subwoofer equalization settings includes identifying a desired phase difference of the zone players in the paired playback system (block 1430). In some examples, the desired phase difference between the example subwoofer 120 relative to the paired zone players (e.g., zone players 116 and 118) is determined by prompting the user to identify a better (e.g., preferred) sounding tone set (e.g., test set A or test set B) via a controller user interface such as the example controller user interface 800 of FIG. 8. For example, a series of tones at and around (e.g., above and/or below) the crossover frequency are output by the paired zone players (e.g., zone players 116, 118 and 120) and alternates between a first test set and a second test set, wherein the subwoofer 120 alternates between 0 degrees phase and in 180 degree phase relative to the zone players 116 and 118. The user identifies whether the first tone set or the second tone set sounds better (e.g., preferred) to the user. In the event the user indicates no difference between the two tone sets (e.g., test set A or test set B), in some examples, a default phase difference is set. The identified phase difference is stored in a subwoofer configuration.

In the illustrated example of FIG. 14, the subwoofer level is identified and stored in the subwoofer configuration (block 1440). In some examples, the paired zone players (e.g., zone players 116, 118 and 120) output a series of tones, for example, at or around the crossover frequency. The user adjusts (e.g., increases and/or decreases) the subwoofer level settings until a user-preferred sound of the paired playback system is reached. For example, a user may prefer more bass (e.g., low frequencies) while listening to an audio track and increase the subwoofer level accordingly. The identified subwoofer level setting is then stored in the subwoofer configuration.

In the illustrated flow diagram of FIG. 14, once the subwoofer equalization has been calibrated (e.g., crossover frequency, phase difference and subwoofer level have been identified and saved), the subwoofer configuration is saved (block 1450). In some examples, the subwoofer configuration is a file stored on the subwoofer in the paired playback system such as, for example, the example subwoofer 120. When a zone including the example subwoofer 120 such as, for example, the home theater zone, is selected to playback an audio track, the example subwoofer 120 recalls the saved subwoofer configuration and adjusts the subwoofer equalization settings accordingly.

In some examples, the subwoofer configuration is stored on the playback system. For example, the subwoofer configuration may be stored on any of the zone players 102-124 accessible via the data network 128. For example, when the home theater zone (e.g., home theater listening zone) is selected to playback an audio track, the subwoofer configuration is communicated from a zone player on the data network 128, such as, for example, zone player 110 of the Office zone, to the subwoofer 120 and the subwoofer equalization settings are then adjusted to match the recalled subwoofer configuration.

In some examples, the subwoofer configuration includes the user identity. For example, the controller 130 used to calibrate the subwoofer 120 in the paired playback system is associated with a particular user. Alternatively and/or additionally, the user may provide a user identity before calibrating the subwoofer configuration (e.g., via a passcode). In some such examples, the recalled subwoofer configuration corresponds to the preferences of the user. For example, if a first user and a second user both have stored subwoofer configuration preferences, then the recalled subwoofer configuration matches the preferences of the user who selected playback on the paired playback system.

In some examples, the subwoofer configuration includes an audio track genre and may adjust the subwoofer equalization settings according to the audio track genre. For example, a user may prefer two different bass settings depending on the type of audio track he is listening to at the moment. For example, the user may prefer more bass while listening to a song than while listening to a news talk program. In some such examples, the subwoofer configuration may automatically (e.g., without prompting) adjust the subwoofer settings to match the genre of the audio track selected to playback. Additionally and/or alternatively, the subwoofer configurations may calibrate to a new genre (e.g., a genre with no saved subwoofer equalization settings in the subwoofer configuration) and prompt the user to accept or reject the updated subwoofer equalization settings via a controller user interface.

In some examples, the subwoofer configuration includes zone scene information and may adjust the subwoofer equalization settings accordingly. For example, the example home theater listening zone and the family listening zone may be included in a zone scene. In some such examples, subwoofer equalization settings may be stored in the subwoofer configuration and recalled when the zone scene is recalled. For example, if the example home theater listening zone is selected for playback and then a zone scene including the home theater listening zone is selected to playback an audio track, the subwoofer configuration may automatically (e.g., without prompting) adjust the example subwoofer 120 settings according to the zone scene settings.

While the methods and apparatus are described in conjunction with a single subwoofer, the example methods and apparatus may also be used with any number of subwoofers without departing from the teachings of this patent. For example, any number of subwoofers (e.g., the example subwoofer 120) may be included in a paired playback system in a listening zone. In some such examples, subwoofer calibration may take place one subwoofer at a time, all of the subwoofers at the same time, or a combination of the above. For example, in a playback system including two subwoofers, both subwoofers may be calibrated using tone set A and tone set B simultaneously. The gain scale (e.g., dB increments) and the gain mid-point may adjust according to the playback devices included in the paired playback system. For example, each additional subwoofer may decrease the gain mid-point represented by the "0" on the example controller user interface 1000 of FIG. 10.

As mentioned above, the examples processes of FIGS. 12 and 14 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering and/or for caching of the information). As used herein, the term tangible computer readable medium is expressly defined to include any type of computer readable storage and to exclude propagating signals. Additionally or alternatively, the example processes of FIGS. 12 and 14 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering and/or for caching of the information). As used herein the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open-ended. Thus, a claim using "at least" as the transition term in its preamble may include elements in addition to those expressly recited in the claim.

Figure 15:
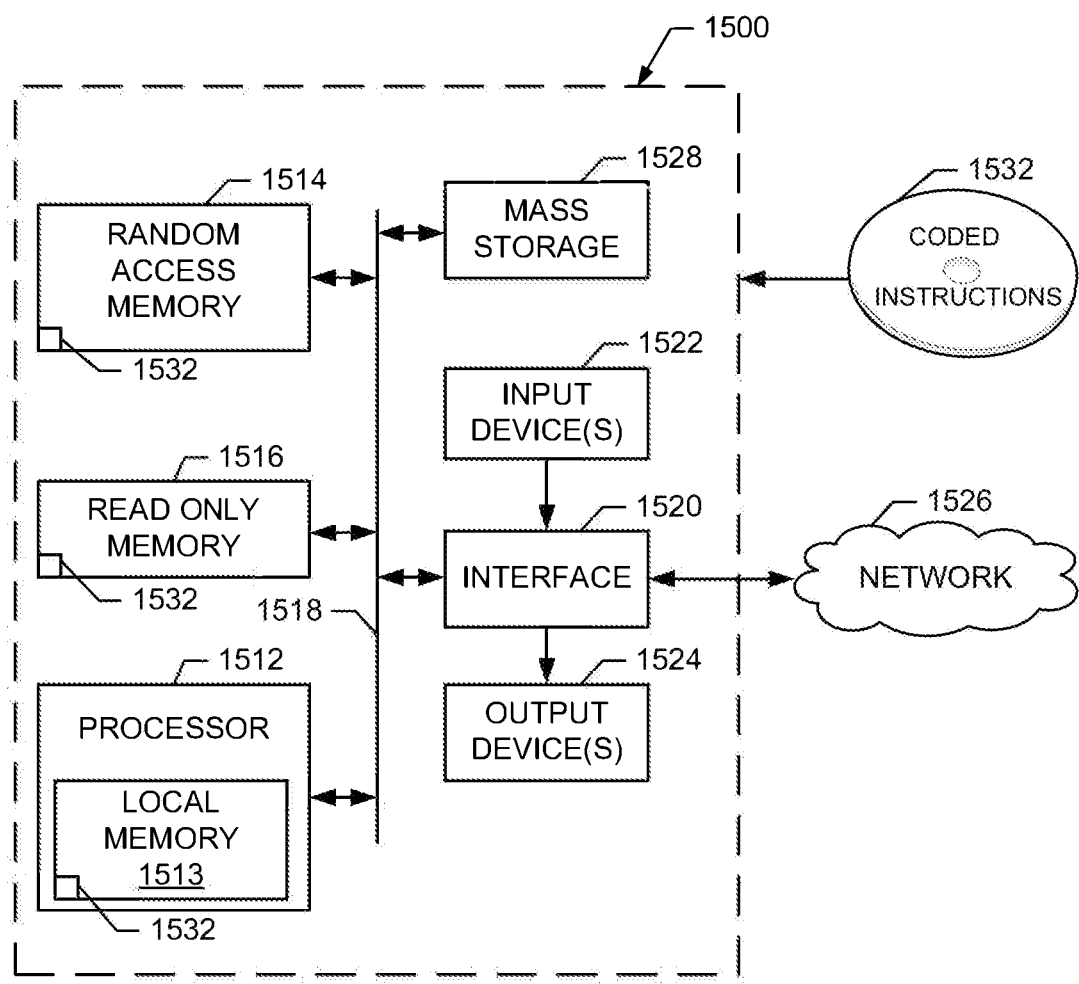
FIG. 15 is a block diagram of an example processing platform capable of executing the example machine readable instructions of FIGS. 12 and 14.

FIG. 15 is a block diagram of an example computer 1500 capable of executing the instructions of FIGS. 12 and 14. The computer 1500 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 1500 of the instant example includes a processor 1512. For example, the processor 1512 can be implemented by one or more microprocessors or controllers from any desired family or manufacturer.

The processor 1512 includes a local memory 1513 (e.g., a cache) and is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The computer 1500 also includes an interface circuit 1520. The interface circuit 1520 may be implemented by any type of interface standard, such as an Ethernet interface, a universal serial bus (USB), and/or a PCI express interface.

One or more input devices 1522 are connected to the interface circuit 1520. The input device(s) 1522 permit a user to enter data and commands into the processor 1512. The input device(s) can be implemented by, for example, a keyboard, a mouse, a touchscreen, a track-pad, a trackball, isopoint and/or a voice recognition system.

One or more output devices 1524 are also connected to the interface circuit 1520. The output devices 1524 can be implemented, for example, by display devices (e.g., a liquid crystal display, a cathode ray tube display (CRT), a printer and/or speakers). The interface circuit 1520, thus, typically includes a graphics driver card.

The interface circuit 1520 also includes a communication device such as a modem or network interface card to facilitate exchange of data with external computers via a network 1526 (e.g., an Ethernet connection, a digital subscriber line (DSL), a telephone line, coaxial cable, a cellular telephone system, etc.).

The computer 1500 also includes one or more mass storage devices 1528 for storing software and data. Examples of such mass storage devices 1528 include floppy disk drives, hard drive disks, compact disk drives and digital versatile disk (DVD) drives. The mass storage device 1528 may implement the local storage device.

The coded instructions 1532 of FIGS. 12 and 14 may be stored in the mass storage device 1528, in the volatile memory 1514, in the non-volatile memory 1516, and/or on a removable storage medium such as a CD or DVD.

From the foregoing, it will be appreciated that the above disclosed methods, apparatus and articles of manufacture enable improved subwoofer equalization by prompting the music listener to identify a plurality of user-preferred tones rather than adjusting the subwoofer equalization settings manually. The subwoofer outputs a series of tones based on the identified audio characteristics of the paired playback system and adjusts the subwoofer configuration according to a selection of a user-preferred tone. Additionally, the subwoofer equalization settings are able to automatically adjust based on the user preferences of the user selecting playback and/or the genre of the audio track selected to playback.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A subwoofer comprising:
   at least one processor;
   at least one non-transitory computer-readable medium; and
   program instructions stored on the at least one non-transitory computer-readable medium that are executable by the at least one processor such that the subwoofer is configured to:
      form a synchrony group with a first playback device such that the subwoofer and the first playback device are configured to play back media content in synchrony;
      output first sound from one or more speaker components of the subwoofer;
      based on (i) the first sound outputted by the subwoofer and (ii) second sound outputted by the first playback device, determine a first updated crossover frequency for the subwoofer;
      update one or more configuration settings of the subwoofer based on the first updated crossover frequency for the subwoofer;
      determine that a second playback device has joined the synchrony group;
      based on (i) third sound outputted by the subwoofer, (ii) fourth sound outputted by the first playback device, and (iii) fifth sound outputted by the second playback device, determine a second updated crossover frequency for the subwoofer; and
      update the one or more configuration settings of the subwoofer based on the second updated crossover frequency for the subwoofer.

2. The subwoofer of claim 1, wherein the one or more configuration settings include one or more of (i) a phase setting, (ii) a gain setting, or (iii) a crossover frequency setting.

3. The subwoofer of claim 2, further comprising program instructions that are executable by the at least one processor such that the subwoofer is configured to determine an updated phase and an updated gain for the subwoofer, and
   wherein the program instructions that are executable by the at least one processor such that the subwoofer is configured to update the one or more configuration settings of the subwoofer further comprise program instructions that are executable by the at least one processor such that the subwoofer is configured to:
      update the one or more configuration settings of the subwoofer based on the updated phase and the updated gain.

4. The subwoofer of claim 1, wherein the first sound comprises a series of frequencies and corresponding harmonic tones.

5. The subwoofer of claim 1, wherein the first updated crossover frequency for the subwoofer matches a respective crossover frequency for the first playback device, and wherein the second updated crossover frequency for the subwoofer matches a respective updated crossover frequency for the first playback device and a respective crossover frequency for the second playback device.

6. The subwoofer of claim 1, further comprising program instructions stored on the at least one non-transitory computer-readable medium that are executable by the at least one processor such that the subwoofer is configured to:
   before forming the synchrony group with the first playback device, determine an initial crossover frequency for the subwoofer.

7. The subwoofer of claim 1, further comprising program instructions that are executable by the at least one processor such that the subwoofer is configured to:
   before outputting the first sound, receive from a control device an indication of a user request to initiate updating the one or more configuration settings.

8. The subwoofer of claim 1, further comprising program instructions that are executable by the at least one processor such that the subwoofer is configured to:
   based on the first sound outputted by the subwoofer, determine one or more environmental characteristics of an environment in which the subwoofer is located;
   determine a size and an orientation of the first playback device; and
   update the one or more configuration settings of the subwoofer based on the one or more environmental characteristics and the size and orientation of the first playback device.

9. The subwoofer of claim 1, further comprising program instructions that are executable by the at least one processor such that the subwoofer is configured to:
   based on the first sound outputted by the subwoofer, determine one or more environmental characteristics of an environment in which the subwoofer is located;
   based on an indication received from the first playback device, determine a size and an orientation of the first playback device; and update the one or more configuration settings of the subwoofer based on the one or more environmental characteristics and the size and orientation of the first playback device.

10. At least one non-transitory computer-readable medium, wherein the at least one non-transitory computer-readable medium is provisioned with program instructions that, when executed by at least one processor, cause a subwoofer to:
form a synchrony group with a first playback device such that the subwoofer and the first playback device are configured to play back media content in synchrony;
output first sound from one or more speaker components of the subwoofer;
based on (i) the first sound outputted by the subwoofer and (ii) second sound outputted by the first playback device, determine a first updated crossover frequency for the subwoofer;
update one or more configuration settings of the subwoofer based on the first updated crossover frequency for the subwoofer;
determine that a second playback device has joined the synchrony group;
based on (i) third sound outputted by the subwoofer, (ii) fourth sound outputted by the first playback device, and (iii) fifth sound outputted by the second playback device, determine a second updated crossover frequency for the subwoofer; and
update the one or more configuration settings of the subwoofer based on the second updated crossover frequency for the subwoofer.

11. The at least one non-transitory computer-readable medium of claim 10, wherein the one or more configuration settings include one or more of (i) a phase setting, (ii) a gain setting, or (iii) a crossover frequency setting.

12. The at least one non-transitory computer-readable medium of claim 11, wherein the at least one non-transitory computer-readable medium is also provisioned with program instructions that, when executed by at least one processor, cause the subwoofer to determine an updated phase and an updated gain for the subwoofer, and
wherein the program instructions that, when executed by the at least one processor, cause the subwoofer to update the one or more configuration settings of the subwoofer further comprise program instructions that, when executed by the at least one processor, cause the subwoofer to:
update the one or more configuration settings of the subwoofer based on the updated phase and the updated gain.

13. The at least one non-transitory computer-readable medium of claim 10, wherein the first sound comprises a series of frequencies and corresponding harmonic tones.

14. The at least one non-transitory computer-readable medium of claim 10, wherein the first updated crossover frequency for the subwoofer matches a respective crossover frequency for the first playback device, and wherein the second updated crossover frequency for the subwoofer matches a respective updated crossover frequency for the first playback device and a respective crossover frequency for the second playback device.

15. The at least one non-transitory computer-readable medium of claim 10, wherein the at least one non-transitory computer-readable medium is also provisioned with program instructions that, when executed by at least one processor, cause the subwoofer to:
before forming the synchrony group with the first playback device, determine an initial crossover frequency for the subwoofer.

16. The at least one non-transitory computer-readable medium of claim 10, wherein the at least one non-transitory computer-readable medium is also provisioned with program instructions that, when executed by at least one processor, cause the subwoofer to:
before outputting the first sound, receive from a control device an indication of a user request to initiate updating the one or more configuration settings.

17. A method carried out by a subwoofer, the method comprising:
forming a synchrony group with a first playback device such that the subwoofer and the first playback device are configured to play back media content in synchrony;
outputting first sound from one or more speaker components of the subwoofer;
based on (i) the first sound outputted by the subwoofer and (ii) second sound outputted by the first playback device, determining a first updated crossover frequency for the subwoofer;
updating one or more configuration settings of the subwoofer based on the first updated crossover frequency for the subwoofer;
determining that a second playback device has joined the synchrony group;
based on (i) third sound outputted by the subwoofer, (ii) fourth sound outputted by the first playback device, and (iii) fifth sound outputted by the second playback device, determining a second updated crossover frequency for the subwoofer; and
updating the one or more configuration settings of the subwoofer based on the second updated crossover frequency for the subwoofer.

18. The method of claim 17, wherein the one or more configuration settings include one or more of (i) a phase setting, (ii) a gain setting, or (iii) a crossover frequency setting.

19. The method of claim 18, further comprising determining an updated phase and an updated gain for the subwoofer, and
wherein updating the one or more configuration settings of the subwoofer further comprises updating the one or more configuration settings of the subwoofer based on the updated phase and the updated gain.

20. The method of claim 17, wherein the first sound comprises a series of frequencies and corresponding harmonic tones.

* * * * *